(12) United States Patent
　　 Lee et al.

(10) Patent No.: US 11,019,491 B2
(45) Date of Patent: May 25, 2021

(54) APPARATUS AND METHOD FOR PROVIDING MOBILE EDGE COMPUTING SERVICES IN WIRELESS COMMUNICATION SYSTEM

(71) Applicant: Samsung Electronics Co., Ltd., Suwon-si (KR)

(72) Inventors: Jicheol Lee, Suwon-si (KR); Sunghoon Kim, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/870,078

(22) Filed: May 8, 2020

(65) Prior Publication Data
　　US 2020/0359218 A1　　Nov. 12, 2020

Related U.S. Application Data

(60) Provisional application No. 62/845,426, filed on May 9, 2019.

(30) Foreign Application Priority Data

Apr. 9, 2020　(KR) .................. 10-2020-0043419
Apr. 29, 2020　(KR) .................. 10-2020-0052917

(51) Int. Cl.
　　*H04W 12/06*　　(2021.01)
　　*H04L 29/06*　　(2006.01)
　　*H04L 9/32*　　(2006.01)
　　*H04W 12/08*　　(2021.01)
　　*H04W 12/63*　　(2021.01)

(52) U.S. Cl.
　　CPC ......... *H04W 12/068* (2021.01); *H04L 9/3242* (2013.01); *H04L 63/0838* (2013.01);
　　(Continued)

(58) Field of Classification Search
　　CPC ... H04W 84/045; H04W 24/02; H04W 88/08; H04W 88/02; H04W 48/00; H04W 48/20;
　　(Continued)

(56) References Cited

U.S. PATENT DOCUMENTS 8,843,636 B1　9/2014　Wu et al.
8,935,757 B2　1/2015　Srinivasan et al.
(Continued)

OTHER PUBLICATIONS

Samsung; Application architecture for enabling edge applications; 3GPP TSG SA WG6#30; Apr. 12, 2019, Newport Beach, California, USA.

(Continued)

*Primary Examiner* — Kwasi Karikari
(74) *Attorney, Agent, or Firm* — Jefferson IP Law, LLP

(57) ABSTRACT

The disclosure relates to a $5^{th}$ generation (5G) or pre-5G communication system for supporting a data transmission rate higher than that of a $4^{th}$ generation (4G) system, such as long-term evolution (LTE). The disclosure relates to authentication and authorization for edge computing applications, and an operation method of a user equipment (UE) in a wireless communication system. The method may include transmitting, to a server, a first message including at least one of information related to the UE or a type of user agent, performing an authentication procedure for an edge computing service according to an authentication method determined based on the first message, receiving a second message indicating authority granted to the edge computing service, based on an authentication code generated by the server according to the performed authentication procedure, and using the edge computing service in a range corresponding to the granted authority.

16 Claims, 26 Drawing Sheets

(52) U.S. Cl.
CPC ........... *H04W 12/08* (2013.01); *H04W 12/63* (2021.01); *H04L 2209/80* (2013.01)

(58) Field of Classification Search
CPC ... H04W 12/06; H04W 12/0608; H04W 8/04; H04W 12/00; H04W 12/0609; H04W 12/1006; H04W 12/1202; H04W 12/00514; H04W 12/0602; H04W 12/0806; H04W 12/1002
See application file for complete search history.

(56) References Cited

U.S. PATENT DOCUMENTS

| | | | |
|---|---|---|---|
| 2015/0208237 A1* | 7/2015 | Kuc | H04L 63/0853 726/4 |
| 2019/0026450 A1 | 1/2019 | Egner et al. | |
| 2019/0045409 A1 | 2/2019 | Rasanen et al. | |
| 2019/0149990 A1* | 5/2019 | Wang | H04W 8/04 370/329 |

OTHER PUBLICATIONS

Samsung Electronics; Architecture principles and requirements; 3GPP TSG-SA WG6 Meeting #30 S6-190873, S6-190842, S6-190805, S6-190766, S6-190571; Apr. 12, 2019, Newport Beach, USA.
Discussions on security of mobile edge computing;3GPP TSG-SA WG3 Meeting #95,Huawei,HiSilicon, Apr. 29, 2019.
MEC in 5G networks; Jun. 30, 2018.
International Search Report and written opinion dated Aug. 24, 2020, in International Application No. PCT/KR2020/006096.

* cited by examiner

APPARATUS AND METHOD FOR PROVIDING MOBILE EDGE COMPUTING SERVICES IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0043419, filed on Apr. 9, 2020, in the Korean Intellectual Property Office, a Korean patent application number 10-2020-0052917, filed on Apr. 29, 2020, in the Korean Intellectual Property Office, and under 35 U.S.C. § 119(e) of a U.S. Provisional application Ser. No. 62/845,426, filed on May 9, 2019, in the U.S. Patent and Trademark Office, the disclosures of each of which are incorporated by reference herein in their entireties.

BACKGROUND

1. Field

The disclosure relates to a wireless communication system. More particularly, the disclosure relates to an apparatus and a method for providing mobile edge computing (MEC) services in a wireless communication system.

2. Description of Related Art

To meet the demand for wireless data traffic having increased since deployment of $4^{th}$ generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, technologies for providing edge computing services in connection with 5G systems are emerging. "Edge computing" is a technology that provides computing resources to users at a physically close distance. In particular, mobile edge computing is edge computing realized in a mobile environment such as 5G systems, and is expected to provide more powerful computing power with a low latency.

The above information is described as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for providing mobile edge computing (MEC) services in a wireless communication system.

Another aspect of the disclosure is to provide an apparatus and a method for performing an authentication procedure for granting authorization for mobile edge computing services in a wireless communication system.

Additional aspects will be set forth in part in the description which follows and, in part, will be apparent from the description, or may be learned by practice of the presented embodiments.

In addition, the disclosure provides an apparatus and a method for determining an authentication method for authorization for mobile edge computing services in a wireless communication system.

Further, the disclosure provides an apparatus and a method for determining whether or not to grant authorization for mobile edge computing services in a wireless communication system In accordance with an aspect of the disclosure, an operation method of a user equipment (UE) in a wireless communication system is provided. The method includes transmitting, to a server, a first message including at least one of information related to the UE or a type of user agent, performing an authentication procedure for an edge computing service according to an authentication method determined based on the first message, receiving a second message indicating authority granted to the edge computing service, based on an authentication code generated by the server according to the performed authentication procedure, and using the edge computing service in the range corresponding to the granted authority.

In accordance with another aspect of the disclosure, a UE device in a wireless communication system is provided. The device includes a transceiver, and at least one processor connected to the transceiver, wherein the at least one processor may be configured to: transmit, to a server, a first message including at least one of information related to the UE or the type of user agent, perform an authentication procedure for an edge computing service according to an authentication method determined based on the first message, receive a second message indicating authority granted to the edge computing service, based on an authentication code generated by the server according to the performed authentication procedure, and use the edge computing service in the range corresponding to the granted authority.

In accordance with another aspect of the disclosure, an operation method of a server for authorization for an edge computing service is provided. The method includes receiving, from a UE, a first message including at least one of information related to the UE or the type of user agent, performing an authentication procedure according to an authentication method determined based on the first message, transmitting, to the UE, an authentication code generated according to the performed authentication procedure, and transmitting a second message indicating authority granted to the edge computing service, based on the authentication code, wherein the edge computing service may be used by the UE in the range corresponding to the granted authority.

In accordance with another aspect of the disclosure, a server device for authorization for an edge computing application in a wireless communication system is provided. The device includes a transceiver, and at least one processor connected to the transceiver, wherein the at least one processor may be configured to: receive, from a UE, a first message including at least one of information related to the UE or the type of user agent, perform an authentication procedure according to an authentication method determined based on the first message, transmit, to the UE, an authentication code generated according to the performed authentication procedure, and transmit a second message indicating authority granted to the edge computing service, based on the authentication code, wherein the edge computing service may be used by the UE in the range corresponding to the granted authority.

The apparatus and the method according to various embodiments are capable of providing differentiated edge computing services to respective mobile communication subscribers without additional subscriber information for the edge computing services. In addition, the apparatus and the method according to various embodiments enable an efficient authentication procedure to be performed using a more suitable authentication method.

Effects obtainable from the disclosure may not be limited to the above mentioned effects, and other effects which are not mentioned may be clearly understood, through the following descriptions, by those skilled in the art to which the disclosure pertains.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the disclosure relates to an apparatus and a method for providing mobile edge computing (MEC) services in a wireless communication system. Specifically, the disclosure describes a technique for providing different edge computing services to respective subscribers through an authentication procedure according to an authentication method determined based on a variety of information and an authorization procedure for an edge application in a wireless communication system.

In the following description, terms referring to signals, terms referring to channels, terms referring to control information, terms referring to network entities, terms referring to data stored in network entities, terms referring to messages exchanged between entities, terms referring to device elements, and the like are illustratively used for the sake of convenience. Therefore, the disclosure is not limited by the terms as used below, and other terms referring to subjects having equivalent technical meanings may be used.

Further, various embodiments of the disclosure will be described using terms and names defined in some communication standards (e.g., 3rd generation partnership project (3GPP) standards) by way of example. However, various embodiments of the disclosure may be applied to other communication systems through modifications that are easily made.

Figure 1:
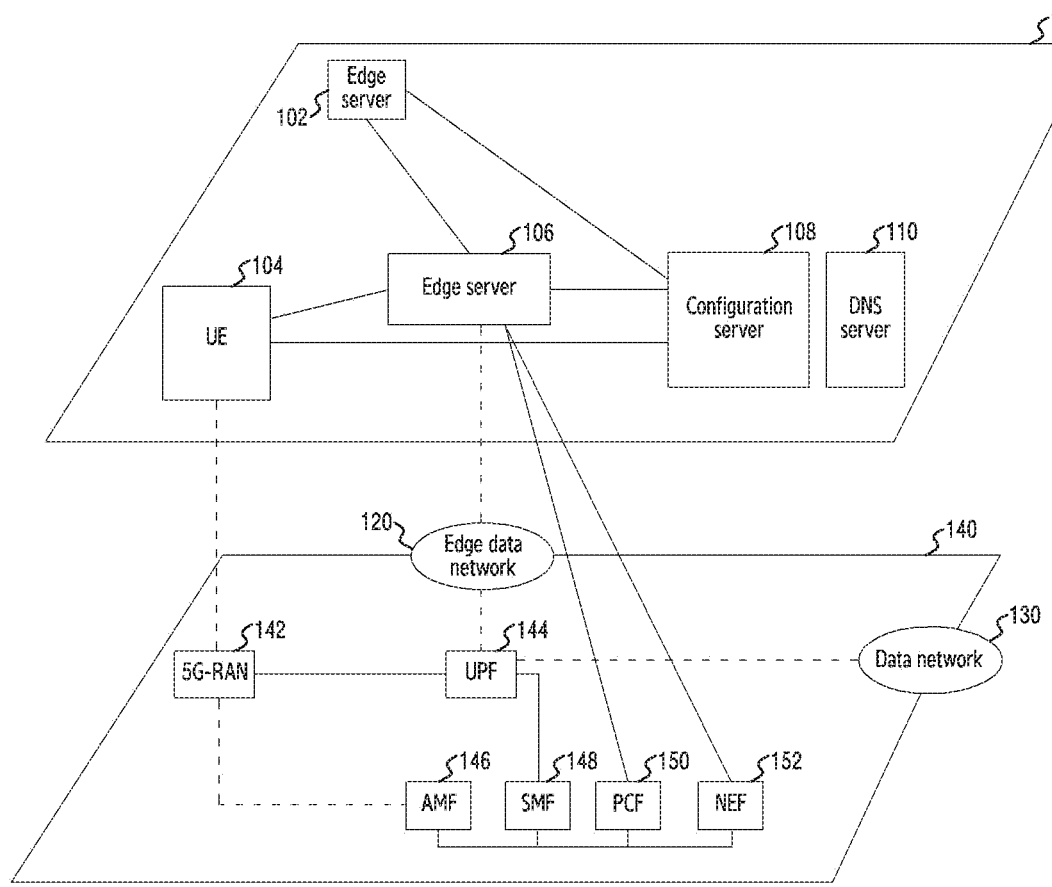
FIG. 1 illustrates a wireless communication system according to an embodiment of the disclosure.

FIG. 1 illustrates a wireless communication system according to an embodiment of the disclosure. The wireless communication system illustrated in FIG. 1 includes an edge computing system 100 and a 5G system 140.

Referring to FIG. 1, the edge computing system may include edge servers 102 and 106, a user equipment (UE) 104, a configuration server 108, and a domain name system (DNS) server 110.

Each of the edge servers 102 and 106 is a server that the UE 104 accesses in order to use mobile edge computing (MEC) services. A third-party application server provided by a third party may be driven in each of the edge servers 102 and 106.

The configuration server 108 is an initial access server for providing the UE 104 with configuration information for using the MEC services. The configuration server 108 may perform a function of transmitting configuration information for using the MEC services to the UE 104. The configuration server 108 is aware of deployment of the edge servers 102 and 106. Accordingly, the UE 104 may access the configuration server 108 before using MEC services, thereby acquiring configuration information necessary for the MEC services, for example, information on the edge servers 102 and 106 that the UE 104 must access at a specific location.

The DNS server 110 may be used to resolve Internet protocol (IP) addresses of the edge servers 102 and 106 or resolve IP addresses of application servers that are operated in the upper layers of the edge servers 102 and 106. That is, the DNS server 110 may be a network function that is aware of information on the edge servers 102 and 106 or information on the application servers that are driven in the upper layers of the edge servers 102 and 106. The DNS server 110 may be provided to each edge data network 120 that covers a specific area, or a single DNS server 110 may be provided to the entire edge computing system. In the case where the DNS server 110 for MEC is provided to each edge data network 120 that covers a specific area, the UE 104 is required to recognize information on the DNS for the corresponding location. In the case where a single DNS server 110 is provided to the entire edge computing system, the DNS server 110 is required to recognize information on the edge servers 102 and 106 disposed in the entire network and information on the application servers provided by the edge computing system, and the corresponding information may be provided to the DNS server 110 by the edge servers 102 and 106.

The UE 104 is a device used by a user and performs communication with a 5G-RAN 142 through a wireless channel. In some cases, the UE 104 may be operated without the intervention of a user. That is, the UE 104 may be a device that performs machine-type communication (MTC), and may not be held by the user. UE 104 may be referred to as "terminal", "mobile station", "subscriber station", "remote terminal", "wireless terminal", "user device", or another term having a technical meaning equivalent thereto, as well as "UE".

In addition, the 5G system may include a 5G-radio access network (RAN) 142, a user plane function (UPF) 144, an access and mobility management function (AMF) 146, a session management function (SMF) 148, a policy and charging function (PCF) 150, and a network exposure function (NEF) 152. The AMF 146 is a network function of managing the mobility of the UE 104. The SMF 148 is a network function of managing a packet data network (PDN)

connection provided to the UE. The connection may be referred to as a "protocol data unit (PDU) session". The PCF 150 is a network function of applying a service policy, a charging policy, and a policy for the PDU session of a mobile communication service provider with respect to the UE. The NEF 152 is able to access information for managing the UE in the 5G network, thereby performing subscribing to a mobility management event of the corresponding UE, subscribing to a session management event of the corresponding UE, requesting session-related information, configuring charging information of the corresponding UE, making a request for changing a PDU session policy for the corresponding terminal, and transmitting small data for the corresponding UE. The 5G-RAN 142 refers to a base station that provides a wireless communication function to the UE. The UPF 144 may play the role of a gateway for transmitting packets transmitted and received by the UE. Since the UPF 144 may be located near the edge server 106 in order to support MEC services, the UPF 144 may transmit data packets to the edge data network 120, thereby attaining low-latency transmission. The UPF 144 may also be connected to the data network 130 leading to the Internet. Accordingly, the UPF 144 may route the data to be transmitted to the Internet, among the data transmitted by the UE, to the data network 130. In addition, although not illustrated in FIG. 1, the 5G system may further include a unified data management (UDM). The UDM refers to a network function of storing information on the subscribers.

Figure 2:
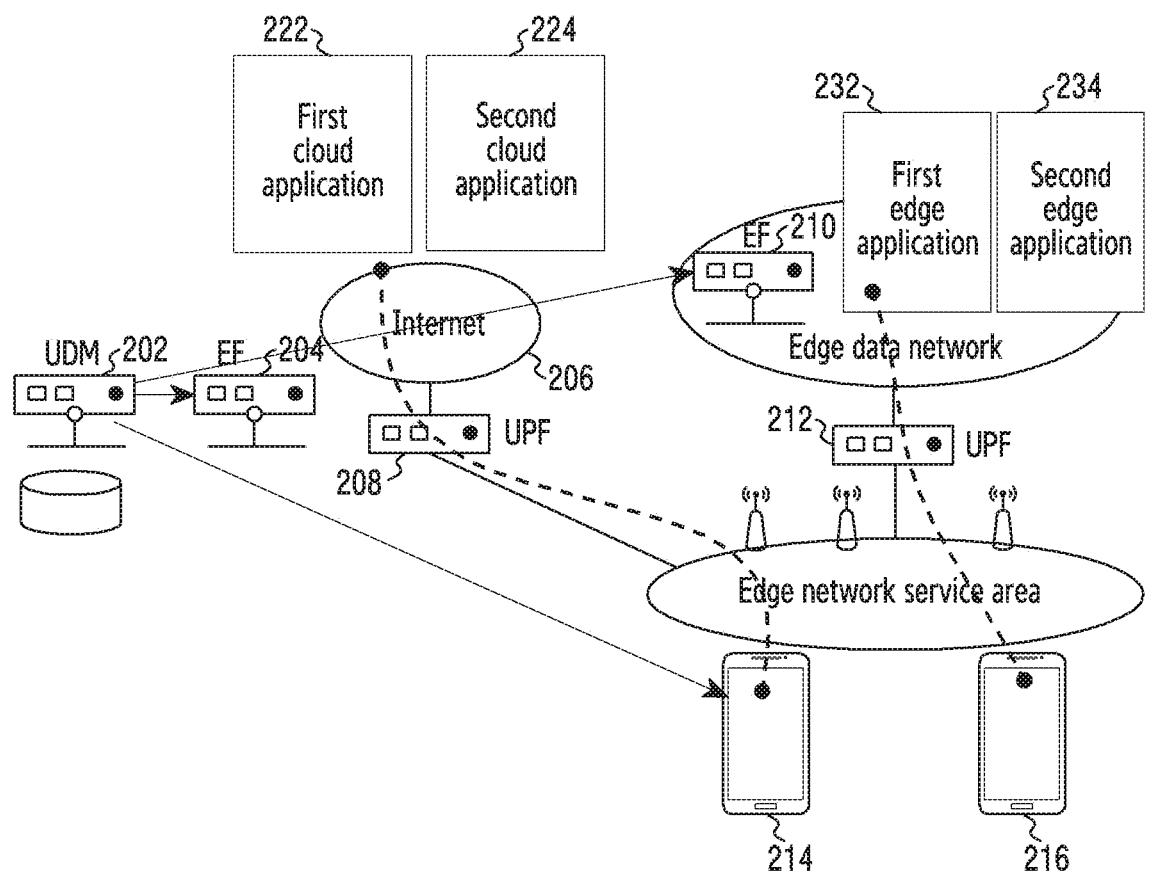
FIG. 2 illustrates an example of providing mobile edge computing (MEC) services in a wireless communication system according to an embodiment of the disclosure.

FIG. 2 illustrates an example of providing mobile edge computing services in a wireless communication system according to an embodiment of the disclosure.

Referring to FIG. 2, an example wireless communication includes UDM 202, EF 204, internet 206, UPF 208, EF 210, UPF 212, UE 214, UE 216, a first cloud application 222, a second cloud application 224, a first edge application 232, and a second edge application 234.

Referring to FIG. 2, a UE 214 and a UE 216 may be located in an edge network service area capable of providing edge computing services through an edge data network. In this case, a mobile communication service provider may provide different services to respective UEs. That is, the mobile communication service provider may differentiate service contents such as whether or not to provide edge computing services, based on at least one of information related to subscribers or a service provider policy. An example of differentiating edge computing services is shown in Table 1 below.

TABLE 1

| UEs | Whether or not to provide edge computing services | Edge application | Location |
|---|---|---|---|
| UE 1 | o | APP 1, APP 2 | Entire area |
| UE 2 | o | APP 1 | Entire area |
| UE 3 | o | APP 2 | East area |
| UE 4 | x | — | — |

Referring to Table 1, the service provider may determine to provide edge computing services to UE 1, UE 2, and UE 3 and to not provide edge computing services to UE 4. In addition, the service provider may permit UE 1 to use edge applications APP 1 and APP 2 over the entire edge network service area, may permit UE 2 to use edge application APP 1 over the entire edge network service area, and may permit UE 3 to use edge application APP 2 in the east area of the edge network service area. On the other hand, the service provider may determine not to allow UE 4 to use edge computing services. That is, the service provider may provide differentiated services as to the type of edge computing service provided and service providing areas, as well as whether or not to provide edge computing services. For example, if the UE 216 corresponds to UE 1, the UE 216 may be provided with services capable of using edge applications APP 1 and APP 2 over the entire edge network service area. In this case, the UE 216 may use at least one of a first edge application and a second edge application provided using an enabling function (EF) 210 through the edge data network. Meanwhile, if the UE 216 corresponds to UE 4, the UE 216 is unable to use edge computing services. Thus, the UE 214 may use at least one of a first cloud application and a second cloud application through the Internet 206.

The EF 204 or 210 described above may perform, as a function of enabling MEC services for the edge application servers, a function of managing information on the edge application servers. In addition, the EF 204 or 210 may perform a function of notifying the UE of information on the edge data network in which the edge application is running and a fully qualified domain name (FQDN) or an IP address necessary for transmitting data to the corresponding edge application server.

Figure 3:
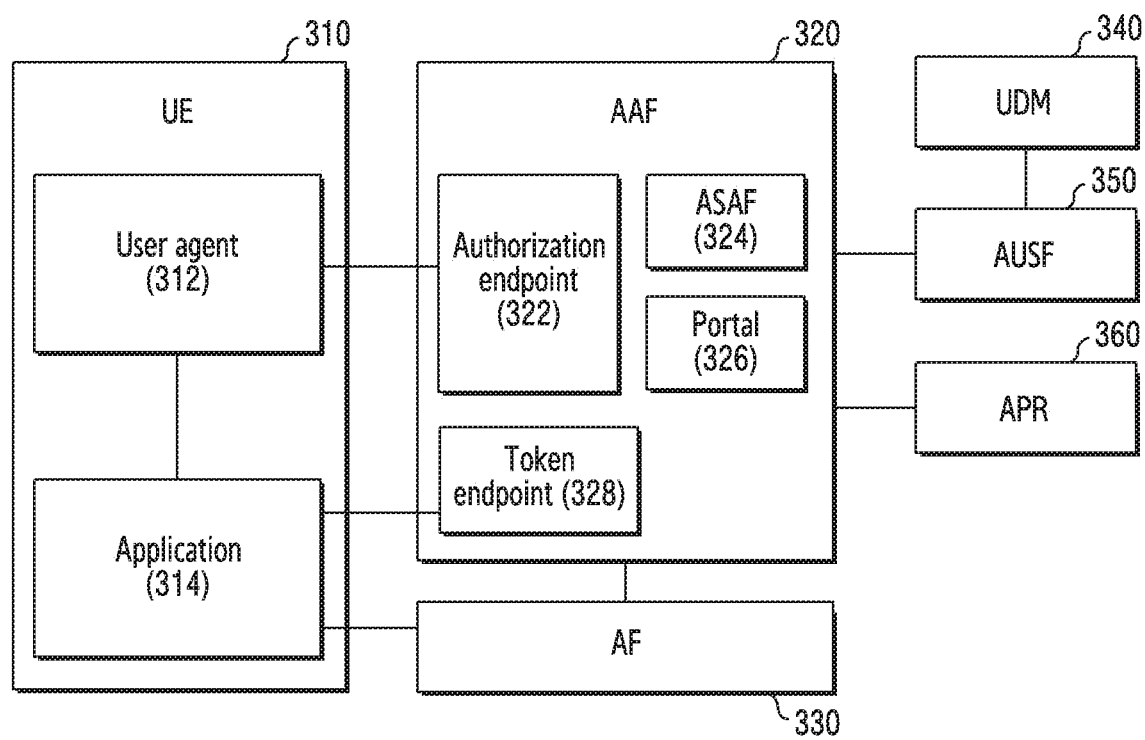
FIG. 3 illustrates a structure for authentication and authorization for an edge application in a wireless communication system according to an embodiment of the disclosure.

FIG. 3 illustrates a structure for authentication and authorization for an edge application in a wireless communication system according to an embodiment of the disclosure.

Referring to FIG. 3, the structure for authentication and authorization includes a UE 310, an application authentication and authorization function (AAF) 320, an application function (AF) 330, a UDM 340, an authentication server function (AUSF) 350, and an application profile record (APR) 360.

The UE 310 may include a user agent 312 and an application 314. In this case, the application 314 is a separate application from the edge application, and UE 310 may perform an authentication procedure for the application layer using the user agent 312 and the application 314.

The AAF 320 may include an authorization endpoint 322, an application security anchor function (ASAF) 324, a portal 326, and a token endpoint 328. The AAF 320 may receive messages, which are transmitted to the authorization endpoint 322, for the UE to perform an authentication procedure for using edge computing services, and may perform the authentication procedure. In this case, the authorization endpoint 322 may be an authorization endpoint of request for comments (RFC) 8252. In addition, after the authentication procedure is completed, the AAF 320 may receive messages transmitted from the UE to the token endpoint 328, and may perform a procedure for authorization for edge computing services. In this case, the token endpoint 328 may be a token endpoint of RFC 8252. In addition, in the case where the authentication procedure is performed according to an authentication method based on a USIM credential, the ASAF 324 may perform a function corresponding to the security-related function performed by a security anchor function (SEAF) in the application layer. In addition, if the authentication procedure is performed according to an authentication method based on a user portal, the AAF 320 may perform a function of a web portal server using the portal 326.

In addition, the AF 330 may perform a function of a general application server for verification of a token transmitted from the UE. For example, the AF 330 may perform functions corresponding to the functions of a resource server of RFC 6750.

In addition, the UDM 340 may store information related to the user of the UE, thereby providing information necessary for performing an authentication procedure and an authorization procedure between the UE and the AAF.

In addition, if authentication and key agreement (AKA) using a USIM credential is performed, the AUSF 350 may operate as an AKA authentication server.

In addition, the APR 360 may store information and profile related to the application, thereby providing information on the application that may be required when the authentication procedure and the authorization procedure are performed.

The detailed operation of objects for the above-described authentication and authorization will be described in detail below.

Figure 4:
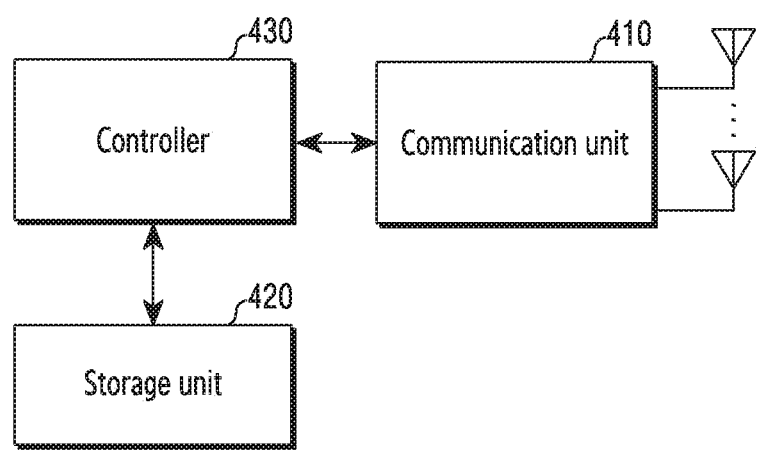
FIG. 4 illustrates the configuration of a terminal in a wireless communication system according to an embodiment of the disclosure.

FIG. 4 illustrates the configuration of a terminal in a wireless communication system according to an embodiment of the disclosure. The configuration shown in FIG. 4 may be understood as the configuration of the UE 310 in FIG. 3. The term "unit" or "-or (er)" to be used below denotes a unit of processing at least one function or operation, and may be implemented as hardware, software, or a combination thereof.

Referring to FIG. 4, the UE includes a communication unit 410 (e.g., a transceiver), a storage unit 420, and a controller 430 (e.g., at least one processor).

The communication unit 410 performs a function of transmitting and receiving a signal through a wireless channel. For example, the communication unit 410 performs a function of conversion between a baseband signal and a bit string according to the physical layer standard of a system. In addition, when transmitting data, the communication unit 410 encodes and modulates transmission bit strings to generate complex symbols. In addition, when receive data, the communication unit 410 demodulates and decodes baseband signals to recover reception bit strings. In addition, the communication unit 410 up-converts a baseband signal to an RF band signal to thus transmit the same through an antenna, and down-converts an RF band signal received through the antenna to a baseband signal. For example, the communication unit 410 may include a transmission filter, a reception filter, an amplifier, a mixer, an oscillator, a DAC, an ADC, and the like.

In addition, the communication unit 410 may include a plurality of transmission and reception paths. Further, the communication unit 410 may include at least one antenna array including a plurality of antenna elements. In terms of hardware, the communication unit 410 may include a digital circuit and an analog circuit {e.g., radio frequency integrated circuit (RFIC)}. In this case, the digital circuit and the analog circuit may be implemented as a single package. In addition, the communication unit 410 may include a plurality of RF chains. Further, the communication unit 410 may perform beamforming.

The communication unit 410 transmits and receives signals as described above. Accordingly, all or some of the communication unit 410 may be referred to as a "transmitter", a "receiver", or a "transceiver". In addition, transmission and reception performed through a wireless channel herein encompass the aforementioned processes performed by the communication unit 410.

The storage unit 420 stores data such as fundamental programs for the operation of the UE, application programs, configuration information, and the like. The storage unit 420 may include a volatile memory, a nonvolatile memory, or a combination thereof. In addition, the storage unit 420 provides stored data at request by the controller 430.

The controller 430 controls the overall operation of the UE. For example, the controller 430 transmits and receives signals through the communication unit 410. In addition, the controller 430 records and reads data in and from the storage unit 420. In addition, the controller 430 may performed functions of a protocol stack required for communication standards. To this end, the controller 430 may include at least one processor or micro-processor, or may be a part of a processor. For example, a part of the communication unit 410 or the controller 430 may be referred to as a "communication processor (CP)". According to various embodiments, the controller 430 may perform control such that the UE executes operations according to various embodiments described below.

Figure 5:
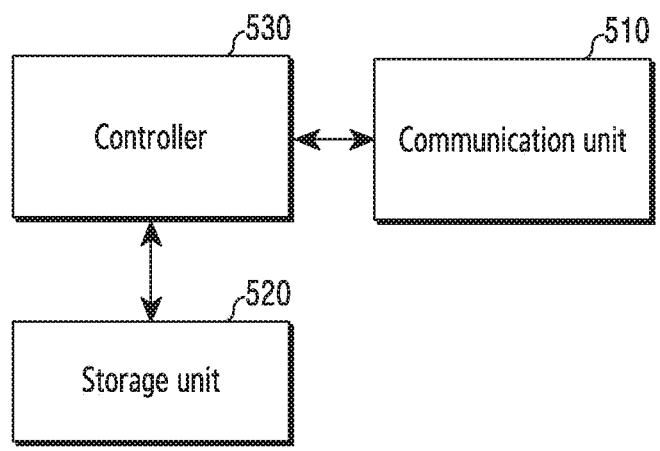
FIG. 5 illustrates the configuration of a server in a wireless communication system according to an embodiment of the disclosure.

FIG. 5 illustrates the configuration of a server in a wireless communication system according to an embodiment of the disclosure. The configuration shown in FIG. 5 may be understood as the configuration of a device having function of at least one of the AAF 320, the AF 330, the UDM 340, the AUSF 350, and the APR 360 shown in FIG. 3. The term "unit" or "-or (er)" to be used below denotes a unit of processing at least one function or operation, and may be implemented as hardware, software, or a combination thereof.

Referring to FIG. 5, the server includes a communication unit 510 (e.g., a transceiver), a storage unit 520, and a controller 530 (e.g., at least one processor).

The communication unit 510 provides an interface for communicating with other devices in a network. That is, the communication unit 510 converts a bit string transmitted from the server to another device into a physical signal, and converts a physical signal received from another device into a bit string. That is, the communication unit 510 may transmit and receive signals. Accordingly, the communication unit 510 may be referred to as a "modem", a "transmitter", a "receiver", or a "transceiver". In this case, the communication unit 510 allows the server to communicate with other devices or systems through a backhaul connection (for example, wired backhaul or wireless backhaul) or a network.

The storage unit 520 stores data such as fundamental programs for the operation of the server, application programs, configuration information, and the like. The storage unit 520 may include a volatile memory, a nonvolatile memory, or a combination thereof. In addition, the storage unit 520 provides stored data at request by the controller 530.

The controller 530 controls the overall operation of the server. For example, the controller 530 transmits and receives signals through the communication unit 510. In addition, the controller 530 records and reads data in and from the storage unit 520. To this end, the controller 530 may include at least one processor. According to various embodiments, the controller 530 may perform control such that the server executes operations according to various embodiments described below.

Figure 6:
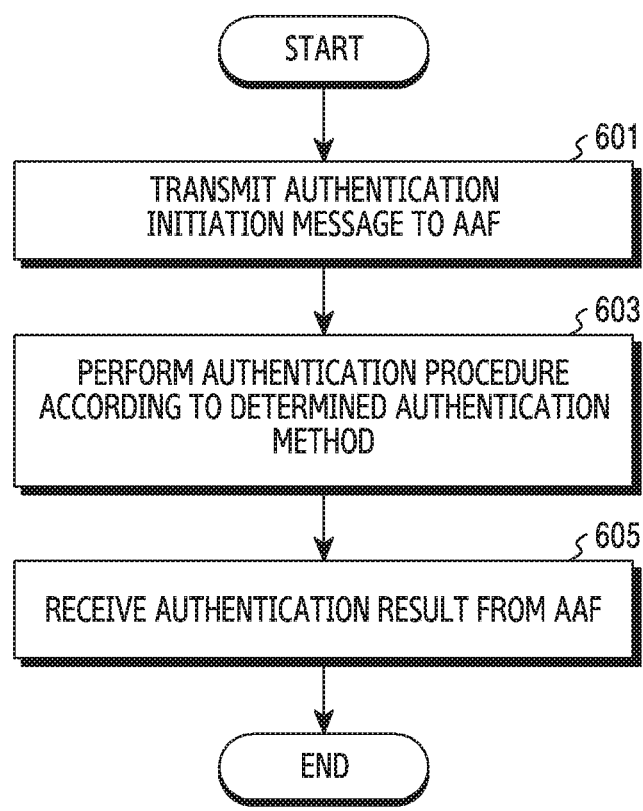
FIG. 6 illustrates a flowchart of a user equipment (UE) for performing an authentication procedure for an edge application in a wireless communication system according to an embodiment of the disclosure.

FIG. 6 illustrates a flowchart of a UE for performing an authentication procedure for an edge application in a wireless communication system according to an embodiment of the disclosure. FIG. 6 illustrates an operation method of the UE 310.

Referring to FIG. 6, in operation 601, the UE transmits an authentication initiation message to the AAF (e.g., the AAF 320). That is, the UE may transmit, to the AAF, a message for initiating an authentication procedure for acquiring authorization for an edge application. According to various embodiments, the authentication initiation message may include information indicating the authentication method to be performed between the UE and the AAF. For example, the authentication initiation message may include at least one of a UE user-related identifier, a UE edge enabler client (EEC) identifier, a response type, a redirection address {uniform resource locator (URL)}, and the type of user agent. The UE user-related identifier may be a subscriber identifier such as a subscription private identity (SUPI) or a generic public subscription identity (GPSI). Here, the GPSI may be identification information such as an email address or a mobile station international subscriber directory number (MSISDN). In addition, the UE user-related identifier may be the identifier of a UE device, such as a permanent equipment identifier (PEI). The response type refers to the type of information or message indicating the authentication result to be transmitted from the AAF after the authentication procedure is completed. For example, the response type may be at least one of an authentication code or an access token. The redirection address is an address for inducing authentication for the edge application, and refers to a web address to be accessed by the UE when the authentication is successful. The user agent may be at least one of the identifier of a browser or the identifier of a program for performing an authentication procedure.

In operation 603, the UE performs an authentication procedure according to a determined authentication method. Specifically, the UE may perform an authentication procedure according to an authentication method determined based on the information included in the authentication initiation message. The authentication method may include at least one of an authentication method based on a USIM credential, an authentication method based on a user portal, an authentication method based on an automatically generated credential, or an authentication method based on an OTP. According to an embodiment, the AAF may determine at least one of the authentication methods described above by identifying the information included in the authentication initiation message. According to another embodiment, after the authentication method is determined by the UE, an authentication initiation message including information indicating the determined authentication method may be transmitted to the AAF. According to various embodiments, the authentication method may be determined by further considering a policy of a mobile communication service provider, a policy related to applications, and the like, in addition to the UE user-related identifier and the type of user agent included in the authentication initiation message.

In operation 605, the UE receives an authentication result from the AAF. If the authentication procedure is successfully performed according to the determined authentication method, the UE may receive, from the AAF, a message indicating that the authentication has been successfully performed. For example, the UE may receive a message including an authentication code from the AAF. In addition, the UE may receive a message that further includes a redirection address. According to various embodiments, the authentication code may be issued based on authorization profile information on the edge application for each subscriber. Specifically, the AAF may receive an authorization profile for each subscriber corresponding to the information included in the authentication initiation message from the UDM, and may generate an authentication code, based on the authorization profile for each subscriber. By receiving the authentication code generated based on the authorization profile for each subscriber, the UE may use the authentication code in order to make a request for issue of an access token. In addition, the UE may access the website indicated by the redirection address included in the message indicating the authentication result.

Figure 7:
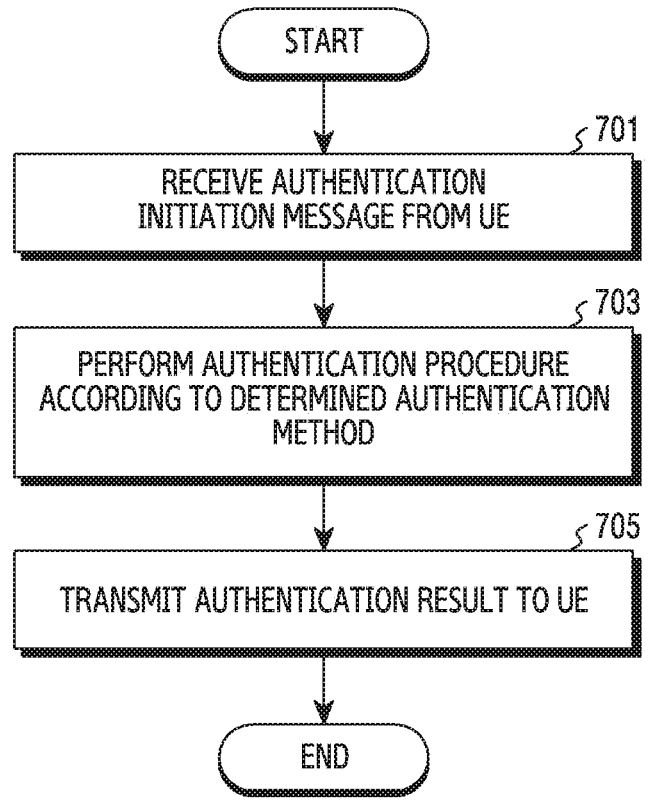
FIG. 7 illustrates a flowchart of an application authentication and authorization function (AAF) for performing an authentication procedure for an edge application in a wireless communication system according to an embodiment of the disclosure.

FIG. 7 illustrates a flowchart of an AAF for performing an authentication procedure for an edge application in a wireless communication system according to an embodiment of the disclosure. FIG. 7 illustrates an operation method of the AAF 320.

Referring to FIG. 7, in operation 701, the AAF receives an authentication initiation message from the UE. That is, the AAF may receive, from the UE, a message for initiating an authentication procedure in order to acquire authorization for an edge application. According to various embodiments, the authentication initiation message may include information indicating the authentication method to be performed between the UE and the AAF. For example, the authentication initiation message may include at least one of a UE user-related identifier, a response type, a redirection address, and the type of user agent. The UE user-related identifier may be a subscriber identifier such as an SUPI or a GPSI. Here, the GPSI may be identification information such as an email address or an MSISDN. In addition, the UE user-related identifier may be the identifier of a UE device, such as a PEI. The response type refers to the type of information or message indicating the authentication result to be transmitted from the AAF after the authentication procedure is completed. For example, the response type may be at least one of an authentication code or an access token. The redirection address is an address for inducing the authentication for the edge application, and refers to a web address to be accessed by the UE when the authentication is successful. The user agent may be at least one of the identifier of a browser or the identifier of a program for performing an authentication procedure.

In operation 703, the AAF performs an authentication procedure according to a determined authentication method. Specifically, the AAF may perform an authentication procedure according to an authentication method determined based on the information included in the authentication initiation message. The authentication method may include at least one of an authentication method based on a USIM credential, an authentication method based on a user portal, an authentication method based on an automatically generated credential, or an authentication method based on an OTP. According to an embodiment, the AAF may determine at least one of the authentication methods described above by identifying the information included in the authentication initiation message. According to another embodiment, after the authentication method is determined by the UE, an authentication initiation message including information indicating the determined authentication method may be transmitted to the AAF. According to various embodiments, the authentication method may be determined by further considering a policy of a mobile communication service provider, a policy related to applications, and the like, in addition to the UE user-related identifier and the type of user agent included in the authentication initiation message.

In operation 705, the AAF transmits an authentication result to the UE. If the authentication procedure is successfully performed according to the determined authentication method, the AAF may transmit, to the UE, a message indicating that the authentication has been successfully performed. For example, the AAF may transmit a message including an authentication code to the UE. In addition, the AAF may transmit a message that further includes a redirection address. According to various embodiments, the authentication code may be issued based on authorization profile information on the edge application for each subscriber. Specifically, the AAF may receive, from the UDM, an authorization profile for each subscriber corresponding to the information included in the authentication initiation message, and may generate an authentication code, based on the authorization profile for each subscriber. By receiving the authentication code generated based on the authorization profile for each subscriber from the AAF, the UE may use the authentication code in order to make a request for issue of an access token. In addition, the UE may access the website indicated by the redirection address included in the message indicating the authentication result.

Figure 8A:
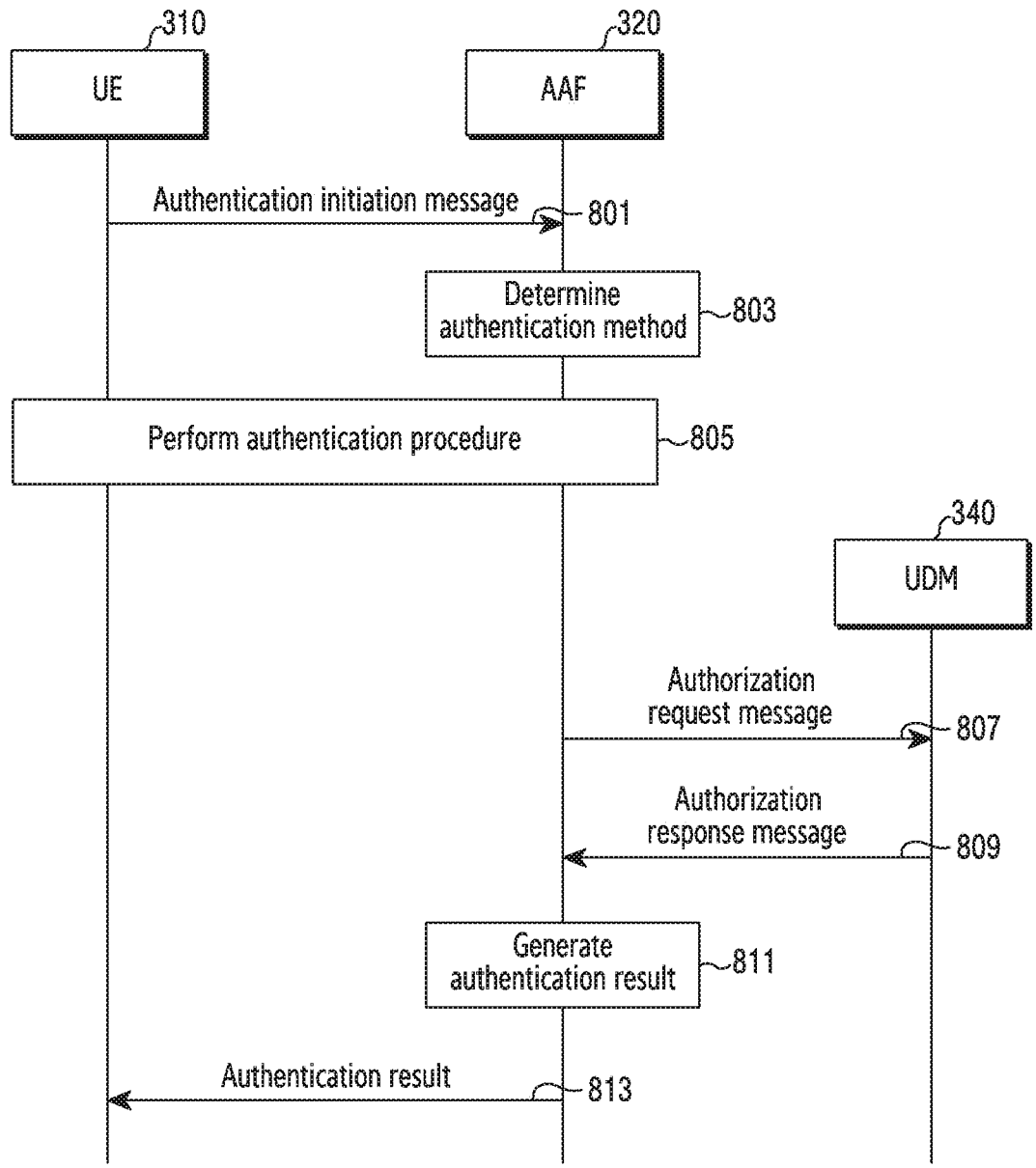
FIG. 8A illustrates a signal exchange diagram for performing an authentication procedure for an edge application in a wireless communication system according to an embodiment of the disclosure.

FIG. 8A illustrates a signal exchange diagram for performing an authentication procedure for an edge application in a wireless communication system according to an embodiment of the disclosure. The signal exchange diagram illustrated in FIG. 8A may be understood as signal flow exchanged between the UE 310, the AAF 320, and the UDM 340.

Referring to FIG. 8A, in operation 801, the UE 310 transmits an authentication initiation message to the AAF 320. The AAF 320 may receive the authentication initiation message from the UE 310. That is, a message for initiating an authentication procedure for acquiring authorization for an edge application may be transmitted from the UE 310 to the AAF 320. According to various embodiments, the authentication initiation message may include information indicating the authentication method to be performed between the UE 310 and the AAF 320. For example, the authentication initiation message may include at least one of a UE user-related identifier, a response type, a redirection address, and the type of user agent. The UE user-related identifier may be a subscriber identifier such as an SUPI or a GPSI. Here, the GPSI may be identification information such as an email address or an MSISDN. In addition, the UE user-related identifier may be the identifier of a UE device, such as a PEI. The response type refers to the type of information or message indicating the authentication result to be transmitted from the AAF 320 after the authentication procedure is completed. For example, the response type may be at least one of an authentication code or an access token. The redirection address is an address for inducing the authentication for the edge application, and refers to a web address to be accessed by the UE 310 when the authentication is successful. The user agent may be at least one of the identifier of a browser or the identifier of a program for performing an authentication procedure.

In operation 803, the AAF 320 determines an authentication method. The AAF 320 may determine an authentication method, based on the information included in the authentication initiation message received from the UE 310. The AAF 320 may determine an authentication method by further considering a policy of a mobile communication service provider, a policy related to applications, and the like, in addition to the UE user-related identifier, the EEC identifier, and the type of user agent included in the authentication initiation message. According to various embodiments, the authentication method may include at least one of an authentication method based on a USIM credential, an authentication method based on a user portal, an authentication method based on an automatically generated credential, or an authentication method based on an OTP. The AAF 320 may identify an authentication method corresponding to the UE user-related identifier and the type of user agent, among the authentication methods described above. Alternatively, the AAF 320 may identify whether or not the UE user-related identifier and the type of user agent correspond to at least one of the authentication methods supported by the policy of a mobile communication service provider or the policy related to applications, thereby determining the authentication method. According to the policy of an edge computing service provider or a mobile communication service provider, the AAF 320 may determine non-authentication in an environment in which the terminal is safely connected to a service provider network.

In operation 805, the UE 310 and the AAF 320 perform an authentication procedure according to the determined authentication method. That is, the UE 310 and the AAF 320 may perform an authentication procedure according to the authentication method determined by the AAF 320, among the authentication method based on a USIM credential, the authentication method based on a user portal, the authentication method based on an automatically generated credential, or the authentication method based on an OTP. Although not shown in FIG. 8A, signal exchanges with at least one object, other than the UE 310, the AAF 320, and the UDM 340, may be performed. Alternatively, if the AAF 320 determine non-authentication, the AAF 320 and the UE 310 do not perform the authentication procedure.

In operation 807, the AAF 320 transmits an authorization request message to the UDM 340. The UDM 340 may receive the authorization request message from the AAF 320. Specifically, if the authentication procedure is successfully performed, an authorization request message requesting an authorization profile for an edge application may be transmitted from the AAF 320 to the UDM 340. According to various embodiments, the authorization request message may include at least one of a subscriber identifier (e.g., SUPI, GPSI, etc.) or an identifier of a UE device (e.g., PEI), or at least one of indicators for configuring the usage of an edge application (e.g., application usage). In this case, the subscriber identifier and the identifier of a UE device may be acquired from the information included in the authentication initiation message received from the UE 310.

In operation 809, the UDM 340 transmits an authorization response message to the AAF 320. The AAF 320 may receive the authorization response message from the UDM 340. Specifically, the UDM 340 may identify information related to a UE user, based on the information included in the authorization request message received from the UDM 340, and an authorization response message including an authorization profile corresponding to the identified subscriber may be transmitted from the UDM 340 to the AAF 320. According to various embodiments, the authorization profile may include at least one of information on whether or not to permit the requested edge computing service to the UE 310, information on whether or not the user of the UE 310 has subscribed to the requested edge computing service, an edge computing service profile identifier, an edge computing service profile index, subscriber category information, and a subscriber level. The edge computing service profile identifier and the edge computing service profile index denote the identifier indicating negotiation information determined through a prior agreement between a mobile communication service provider and an edge application service provider. In addition, the subscriber category represents the class or category information (e.g., class A or class B) of the subscriber managed by the mobile communication service provider. In addition, the subscriber level denotes the priority given to a corresponding subscriber, information for providing differentiated edge computing services, or information on the class of each subscriber (e.g., level 1 or level 2). That is, the UDM 340 may retrieve information such as the subscriber class corresponding to the identifier related to the UE 310 that requested authentication, information on the requested edge computing service, and information on the relationship between the user of the UE 310 and a corresponding edge application, and may provide the retrieved information to the AAF 320 using the authorization response message.

In operation 811, the AAF 320 generates an authentication result. If the AAF 320 determines non-authentication and permits the access of the UE 310 or an edge enabler client (EEC) in the UE, a successful authentication result may be generated. The AAF 320 may generate an authentication result, based on the authorization response message received from the UDM 340. That is, the AAF 320 may determine whether or not to generate an authentication code, based on the authorization response message received from the UDM 340. Specifically, the AAF 320 may not generate the authentication code if the AAF 320 identifies information indicating that the requested edge computing service is not permitted, based on the authorization profile included in the authorization response message. In addition, the AAF 320 may generate an authentication code if the AAF 320 identifies information indicating that the requested edge computing service is permitted.

In operation 813, the AAF 320 transmits the authentication result to the UE 310. The UE 310 may receive the authentication result from the AAF 320. According to various embodiments, if the authentication code is generated, the AAF 320 may transmit, to the UE 310, a message indicating that the authentication has been successfully performed. That is, the AAF 320 may transmit a message including the authentication code to the UE 310. In addition, the AAF 320 may transmit a message that further includes a redirection address. By receiving the authentication code generated based on the authorization profile for each subscriber from the AAF 320, the UE 310 may use the authentication code in order to request the issue of an access token. In addition, the UE 310 may access the website indicated by the redirection address included in the message indicating the authentication result. According to various embodiments, if the authentication code is not generated, the AAF 320 may transmit, to the UE 310, a message indicating that the authentication has failed.

Figure 8B:
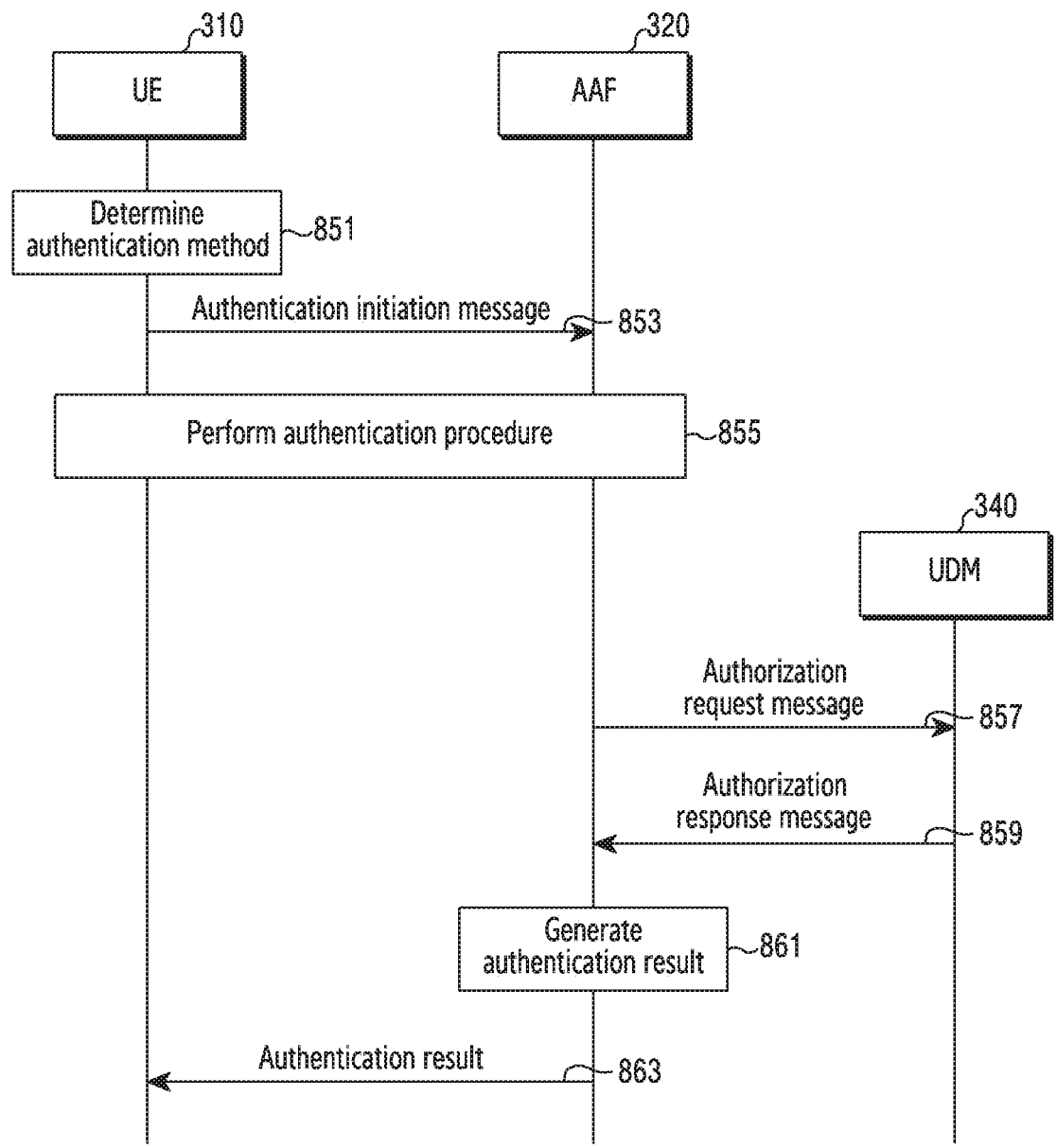
FIG. 8B illustrates another signal exchange diagram for performing an authentication procedure for an edge application in a wireless communication system according to an embodiment of the disclosure.

FIG. 8B illustrates another signal exchange diagram for performing an authentication procedure for an edge application in a wireless communication system according to an embodiment of the disclosure. The signal exchange diagram illustrated in FIG. 8B may be understood as signal flow exchanged between the UE 310, the AAF 320, and the UDM 340.

Referring to FIG. 8B, in operation 851, the UE 310 determines an authentication method. The UE 310 may determine an authentication method in advance before initiating an authorization procedure. Specifically, the UE 310 may determine an authentication method, based on a user input or the pre-acquired policy of a service provider, and may identify the UE user-related identifier, the EEC identifier, and the type of user agent corresponding to the determined authentication method. According to various embodiments, the authentication method may include at least one of an authentication method based on a USIM credential, an authentication method based on a user portal, an authentication method based on an automatically generated credential, or an authentication method based on an OTP. That is, the UE 310 may determine the authentication method corresponding to a user input or the authentication method supported by the policy of a service provider from among the authentication methods described above, and may identify the identifier and the type of user agent used in the authentication procedure according to the determined authentication method.

In operation 853, the UE 310 transmits an authentication initiation message to the AAF 320. The AAF 320 may receive the authentication initiation message from the UE 310. That is, a message for initiating an authentication procedure for acquiring authorization for an edge application may be transmitted from the UE 310 to the AAF 320. According to various embodiments, the authentication initiation message may include information indicating the authentication method to be performed between the UE 310 and the AAF 320. For example, the authentication initiation message may include at least one of a UE user-related identifier, an EEC identifier, a response type, a redirection address, and the type of user agent. The UE user-related identifier may be a subscriber identifier such as an SUPI or a GPSI. Here, the GPSI may be identification information such as an email address or an MSISDN. In addition, the UE user-related identifier may be the identifier of a UE device, such as a PEI. The response type refers to the type of information or message indicating the authentication result to be transmitted from the AAF 320 after the authentication procedure is completed. For example, the response type may be at least one of an authentication code or an access token. The redirection address is an address for inducing the authentication for the edge application, and refers to a web address to be accessed by the UE 310 when the authentication is successful. The user agent may be at least one of the identifier of a browser or the identifier of a program for performing an authentication procedure.

In operation 855, the UE 310 and the AAF 320 perform an authentication procedure according to the determined authentication method. That is, the UE 310 and the AAF 320 may perform an authentication procedure according to the authentication method determined by the AAF 320, among the authentication method based on a USIM credential, the authentication method based on a user portal, the authentication method based on an automatically generated credential, or the authentication method based on an OTP. Although not shown in FIG. 8B, signal exchanges with at least one object, other than the UE 310, the AAF 320, and the UDM 340, may be performed according to the determined authentication method.

In operation 857, the AAF 320 transmits an authorization request message to the UDM 340. The UDM 340 may receive the authorization request message from the AAF 320. Specifically, if the authentication procedure is successfully performed, an authorization request message for requesting an authorization profile for an edge application may be transmitted from the AAF 320 to the UDM 340. According to various embodiments, the authorization request message may include at least one of a subscriber identifier (e.g., SUPI, GPSI, etc.), an EEC identifier, an identifier of a UE device (e.g., PEI), or an indicator for configuring the usage of an edge application (e.g., application usage). In this case, the subscriber identifier, the EEC identifier, and the identifier of a UE device may be acquired from the information included in the authentication initiation message received from the UE 310.

In operation 859, the UDM 340 transmits an authorization response message to the AAF 320. The AAF 320 may receive the authorization response message from the UDM 340. Specifically, the UDM 340 may identify information related to a UE user, based on the information included in the authorization request message received from the UDM 340, and an authorization response message including an authorization profile corresponding to the identified subscriber may be transmitted from the UDM 340 to the AAF 320. According to various embodiments, the authorization profile may include at least one of information on whether or not to permit the requested edge computing service to the UE 310, information on whether or not the user of the UE 310 has subscribed to the requested edge computing service, an edge computing service profile identifier, an allowable EEC identifier, an edge computing service profile index, subscriber category information, and a subscriber level. The edge computing service profile identifier and the edge computing service profile index denote the identifier indicating negotiation information determined through the prior agreement between a mobile communication service provider and an edge application service provider. In addition, the subscriber category represents the class or category information (e.g., class A or class B) of the subscriber managed by the mobile communication service provider. In addition, the subscriber level denotes the priority given to a corresponding subscriber, information for providing differentiated edge computing services, or information on the class of each subscriber (e.g., level 1 or level 2). That is, the UDM 340 may retrieve information such as the subscriber class corresponding to the identifier or the EEC identifier related to the UE 310 that requested the authentication, information on the requested edge computing service, and information on the relationship between the user of the UE 310 and a corresponding edge application, and may provide the retrieved information to the AAF 320 using the authorization response message.

In operation 861, the AAF 320 generates an authentication result. The AAF 320 may generate an authentication result, based on the authorization response message received from the UDM 340. That is, the AAF 320 may determine whether or not to generate an authentication code, based on the authorization response message received from the UDM 340. Specifically, the AAF 320 may not generate the authentication code if the AAF 320 identifies information indicating that the requested edge computing service is not permitted, based on the authorization profile included in the authorization response message. In addition, the AAF 320 may generate an authentication code if the AAF 320 identifies information indicating that the requested edge computing service is permitted.

In operation 863, the AAF 320 transmits an authentication result to the UE 310. The UE 310 may receive the authentication result from the AAF 320. According to various embodiments, if the authentication code is generated, the AAF 320 may transmit, to the UE 310, a message indicating that the authentication has been successfully performed. That is, the AAF 320 may transmit a message including the authentication code to the UE 310. In addition, the AAF 320 may transmit a message that further includes a redirection address. By receiving the authentication code generated based on the authorization profile for each subscriber from the AAF 320, the UE 310 may use the authentication code to request the issue of an access token. In addition, the UE 310 may access the website indicated by the redirection address included in the message indicating the authentication result. According to various embodiments, if the authentication code is not generated, the AAF 320 may transmit, to the UE 310, a message indicating that the authentication has failed.

Figure 9:
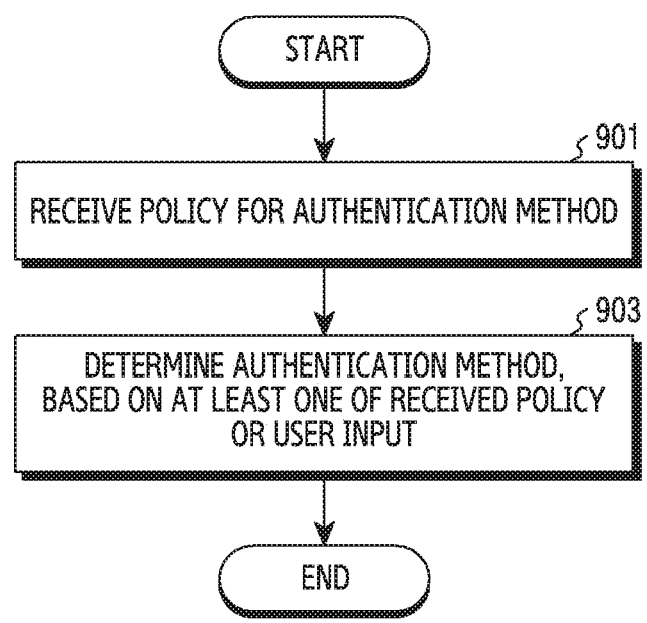
FIG. 9 illustrates a flowchart of a UE for determining an authentication method for an edge application in a wireless communication system according to an embodiment of the disclosure.

FIG. 9 illustrates a flowchart of a UE for determining an authentication method for an edge application in a wireless communication system according to an embodiment of the disclosure. FIG. 9 illustrates an operation method of the UE 310.

Referring to FIG. 9, in operation 901, the UE receives a policy for an authentication method. The UE may predetermine the authentication method before initiating the authentication procedure. That is, the UE may determine the authentication method in consideration of the policy of a service provider that includes information on the authentication method configured by the service provider. The information on the authentication method described above may be transmitted to the UE through any of various paths. For example, the UE may acquire, from a separate configuration server, information on the authentication method configured by a service provider through an application layer using a user plane. For example, the UE may acquire information on the authentication method configured by a service provider through a non-access stratum (NAS) message from a 5G system. The information on the authentication method configured by a service provider, which may be pre-stored in the UE, may include at least one of the type of authentication credential information, an authentication domain of a service provider, and an authentication method. The type of authentication credential information may include at least one of an SUPI, a subscription concealed identifier (SUCI), a GPSI including an MSISDN, an EEC identifier, or an indicator indicating the type of identification (ID) of the application layer managed by a service provider. In addition, the authentication domain of a service provider may include at least one of an identifier of a service provider, a domain name of a service provider, a mobile network code (MNC) of a service provider, or mobile country code (MCC) information of a service provider. In addition, the authentication method may include at least one of an authentication method based on a USIM credential, an authentication method based on a user portal, an authentication method based on an automatically generated credential, an authentication method based on an OTP, an authentication method using a general bootstrapping architecture (GBA), and an authentication method using a certificate of authentication stored in the UE.

In operation 903, the UE determines the authentication method, based on at least one of a received policy or a user input. That is, the UE may determine the authentication method, based on at least one of a received policy or a user input, and may identify the UE user-related identifier, the EEC identifier, and the type of user agent corresponding to the determined authentication method. The UE may transmit an authentication initiation message including the UE user-related identifier and the type of user agent, which are identified, to the AAF, thereby performing the authentication procedure according to the determined authentication method. The policy of a service provider may include information on a plurality of authentication methods supported by the service provider, and the UE may determine at least one of the plurality of authentication methods. For example, if a plurality of authentication methods is identified from the received policy, the UE may determine the authentication method corresponding to a user input, among the plurality of authentication methods. For example, the UE may determine the authentication method according to the priority configured for the respective authentication methods identified from the received policy. According to various embodiments, the UE user-related identifier may include at least one of an SUPI, an SUCI, an MSISDN, a separate user identifier used by a service provider to manage the subscribers, or an identifier of a UE device (e.g., PEI). Alternatively, the UE user-related identifier may be an edge enabler client (EEC) identifier of the UE. For example, if the authentication method configured by a service provider is the authentication method based on a USIM credential, the UE may transmit, to the AAF, as a UE user-related identifier, at least one of an SUPI or an SUCI, or an authentication initiation message including a GPSI related to the SUPI or the SUCI. In addition, the UE may transmit, to the AAF, an authentication initiation message including an identifier for identifying whether the type of user agent corresponds to a web browser for implementing the authentication method based on a USIM credential or a separate user agent. In this case, a separate user agent specified by a service provider or developed by a manufacturer of the UE device may be used.

Figure 10:
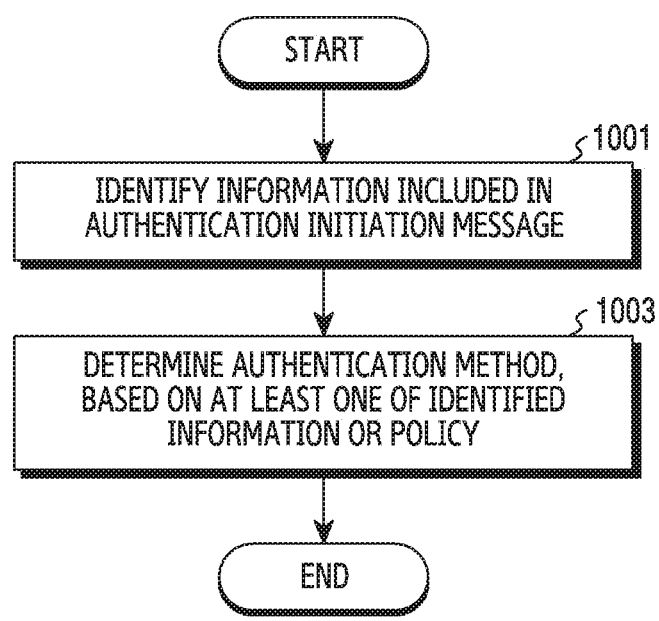
FIG. 10 illustrates a flowchart of an AAF for determining an authentication method for an edge application in a wireless communication system according to an embodiment of the disclosure.

FIG. 10 illustrates a flowchart of an AAF for determining an authentication method for an edge application in a wireless communication system according to an embodiment of the disclosure. FIG. 10 illustrates an operation method of the AAF 320.

Referring to FIG. 10, in operation 1001, the AAF identifies information included in the authentication initiation message. Specifically, the AAF may identify the format of a UE user-related identifier or an edge enabler client identifier (EEC ID) included in the authentication initiation message. For example, if the UE user-related identifier is a GPSI, the AAF may determine an authentication method, based on the username and the domain name included in the identifier. For example, if the UE user-related identifier is an MSISDN, the AAF may identify a home network for performing the authentication procedure and an AUSF corresponding to the home network, based on the identified MSISDN. For example, if the UE user-related identifier is a PEI, the AAF may determine the authentication method by identifying the information on the UE device.

In operation 1003, the AAF determines the authentication method, based on at least one of the identified information or policy. The AAF may determine the authentication method, based on the information identified from the authentication initiation message. In an embodiment, if the UE user-related identifier is a GPSI, the AAF may select different authentication methods depending on the formats of usernames and domain names. Alternatively, the AAF may select different authentication methods using EEC identifiers. That is, if the identifier has a format of a network access identifier (NAI), the identifier may be configured as a format such as "username@domainname", and the AAF may select different authentication methods according to the formats of respective parts "username" and "domainname". For example, in the case where the domain name has a format "5gc.mnc<MNC>.mcc<MCC>.3gppnetwork.org", the username may include a value of an international mobile subscriber identity (IMSI) or an SUCI. In this case, the AAF may identify a home network and an AUSF corresponding to the home network for performing the authentication procedure from the MNC and the MCC, based on the domain name, and may select an AUSF group, based on the SUCI included in the user name. Accordingly, the AAF may select an authentication method based on a USIM credential, which is a method using a hypertext transfer protocol (HTTP) in order to perform the authentication procedure. In another example, in the case where the domain name has a format such as "operator.com", the user name may include a separate UE subscription identifier registered in a portal server operated by a service provider or a $3^{rd}$ party service provider. In this case, if the separate UE subscription identifier is supported by the AAF, and if the type of user agent included in the authentication initiation message is identified as a web browser, the AAF may select the authentication method based on a user portal in order to perform the authentication procedure. According to another embodiment, in the case where the UE user-related identifier is an MSISDN, the AAF may select a home network and an AUSF of the home network, based on the MSISDN, and may select the authentication method based on an OTP, which is a method using the MSISDN. According to another embodiment, in the case where the UE user-related identifier is a PEI, the AAF may select the authentication method based on an automatically generated credential, which is a method utilizing UE subscription information. Alternatively, if the AAF 320 receives, from the UE, a request for generating a key from an AKMA anchor function (AAnF) or an AUSF in a 5GC network using an authentication and key management for application (AKMA) key, the AAF 320 may make a request to a NEF or an AUSF in the 5GC network for generating the key.

Figure 11:
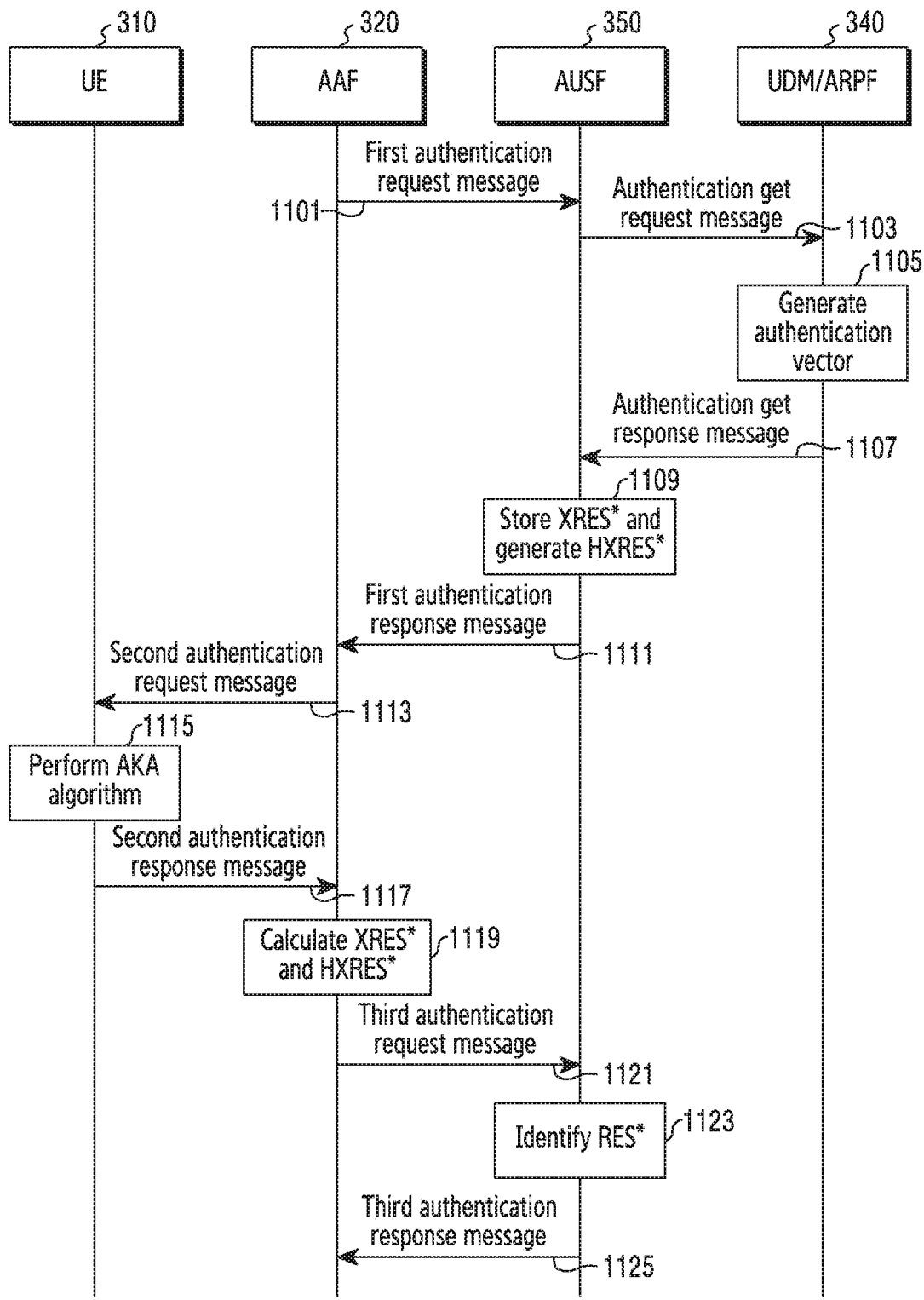
FIG. 11 illustrates a signal exchange diagram for performing an authentication procedure based on a USIM credential in a wireless communication system according to various embodiments.

FIG. 11 illustrates a signal exchange diagram for performing an authentication procedure based on a USIM credential in a wireless communication system according to an embodiment of the disclosure. The signal exchange diagram illustrated in FIG. 11 may be understood as signal flow exchanged between the UE 310, the AAF 320, the UDM/ARPF (authentication credential repository and processing function) 340, and the AUSF 350. The authentication procedure described in FIG. 11 may follow an HTTP AKA procedure.

Referring to FIG. 11, in operation 1101, the AAF 320 transmits a first authentication request message to the AUSF 350. The AUSF 350 may receive the first authentication request message from the AAF 320. Specifically, the AAF 320 identifies the AUSF 350 for performing the authentication procedure based on the USIM credential determined based on the authentication initiation message received from the UE 310. If the AUSF 350 is identified, the AAF 320 transmits a first authentication request message for requesting authentication to the identified AUSF 350. The first authentication request message may be referred to as an "authenticate request", but is not limited thereto, and various names for requesting authentication may be used therefor. According to various embodiments, the first authentication request message may include at least one of a UE user-related identifier, the identifier of the AAF 320 (AAF ID), and the identifier of an application provider (application provider ID). In this case, the UE user-related identifier may be an identifier corresponding to the determined authentication method, among a GPSI, an SUPI, and an SUCI. In addition, the identifier of the AAF 320 may be an identifier for identifying the individual AAF 320 that transmits the first authentication request message. In addition, the identifier of an application provider may be an identifier for identifying a separate service provider in a cooperative relationship with the mobile communication service provider, and may have the form of a reverse fully qualified domain name (FQDN).

In operation 1103, the AUSF 350 transmits an authentication get request message to the UDM/ARPF 340. The UDM/ARPF 340 may receive the authentication get request message from the AUSF 350. The authentication get request message may be referred to as a "UE authentication get request message". Specifically, the AUSF 350 selects the UDM/ARPF 340, and transmits an authentication get request message to the selected UDM/ARPF 340. The authentication get request message may be understood as a message for transmitting the information received from the AAF 320 to the UDM/ARPF 340 by the AUSF 350. According to various embodiments, the authentication get request message may include at least one of a UE user-related identifier, the identifier of the AAF 320, and the identifier of an application provider. That is, the authentication get request message may include information the same as the information included in the first authentication request message received from the AAF 320, or may be obtained by adding the information described above to the information included in the first authentication request message, and then the authentication get request message may be transmitted to the UDM/ARPF 340. The UE user-related identifier may be an identifier, among a GPSI, an SUPI, and an SUCI, corresponding to the authentication method determined. In addition, the identifier of the AAF 320 may be an identifier for identifying the individual AAF 320 that transmits the first authentication request message. In addition, the identifier of an application provider may be an identifier for identifying a separate service provider in a cooperative relationship with the mobile communication service provider, and may have the form of a reverse FQDN.

In operation 1105, the UDM/ARPF 340 generates an authentication vector. That is, the UDM/ARPF 340 may generate an authentication vector (AV), based on the information included in the received authentication get request message. Specifically, the UDM/ARPF 340 may identify a USIM credential of the UE, based on the UE user-related identifier, which is identified through the authentication get request message. For example, the UDM/ARPF 340 may identify the USIM credential of the UE by performing conversion of a GPSI that is identified from the authentication get request message. The UDM/ARPF 340 may identify the USIM credential, and may generate an authentication vector using the information included in the authentication get request message. For example, the UDM/ARPF 340 may generate XRES* using at least one of the identifier of the AAF 320 and the identifier of an application provider, which are received. That is, in the case where XRES* is generated, at least one of the identifier of the AAF 320 and the identifier of an application provider may be added. Accordingly, the UDM/ARPF 340 may generate an authentication vector including XRES*, a random number (RAND), an authentication token (AUTN), and the KAUSF 350 (or AUSF 350) used as an authentication key, which are information required for the UE 310 to perform the authentication.

In operation 1107, the UDM/ARPF 340 transmits an authentication get response message to the AUSF 350. The AUSF 350 may receive the authentication get response message from the UDM 340. The authentication get response message may be referred to as a "UE authentication get response message". That is, the UDM/ARPF 340 may transmit, to the AUSF 350, a message for transmitting information required for performing authentication to the UE 310. Specifically, the UDM/ARPF 340 may transmit an authentication get response message including an application layer authentication vector to the AUSF 350, and the application layer authentication vector may include XRES*, a RAND, an AUTN, and the KAUSF 350. That is, the authentication vector may be expressed as "application HE AV=RAND, AUTN, XRES*, KAUSF 350".

In operation 1109, the AUSF 350 stores XRES* and generates HXRES*. That is, the AUSF 350 may identify the authentication vector from the authentication get response message received from the UDM/ARPF 340, and may store information included in the identified authentication vector. For example, the AUSF 350 may store XRES* of the authentication vector, and may derive HXRES* based on XRES*.

In operation 1111, the AUSF 350 transmits a first authentication response message to the AAF 320. The AAF 320 may receive the first authentication response message from the AUSF 350. That is, the AUSF 350 may transmit, to the AAF 320, a message for transmitting the information required for the UE 310 to perform authentication. Specifically, the AUSF 350 may transmit a first authentication response message including an application layer authentication vector to the AAF 320. The application layer authentication vector may include HXRES* generated by the AUSF 350. That is, the application layer authentication vector transmitted by the AUSF 350 may include a RAND, an AUTN, and HXRES*, and may be expressed as "application HE AV=RAND, AUTN, HXRES*".

In operation 1113, the AAF 320 transmits a second authentication request message to the UE 310. The UE 310 may receive the second authentication request message from the AAF 320. The second authentication request message may be referred to as an "application authentication request message". That is, the AAF 320 may transmit a message for transmitting the information required for the authentication, which is received from the AUSF 350, to the UE 310. According to various embodiments, since the authentication method based on a USIM credential may be performed according to the HTTP protocol, the second authentication request message may be transmitted using an HTTP response message. For example, the second authentication request message may be transmitted to the UE 310 as a "401 Not Found" response code or a message "WWW-authentication: Digest". In this case, "Digest" may include the RAND and the AUTN among the information included in the application layer authentication vector received from the AUSF 350. That is, the second authentication request message having a format "WWW-authentication: Digest (RAND, AUTN)" may be transmitted from the AAF 320 to the UE 310.

In operation 1115, the UE 310 performs an AKA algorithm Specifically, the UE 310 may generate RES* and an AUTN by performing the AKA algorithm. The UE 310 verifies whether or not the generated AUTN value matches the AUTN value included in the second authentication request message received from the AAF 320.

In operation 1117, the UE 310 transmits a second authentication response message to the AAF 320. The AAF 320 may receive the second authentication response message from the UE 310. The second authentication response message may be referred to as an "application authentication response message". Specifically, if the authentication is successful as a result of comparing the AUTN value generated by the UE 310 with the AUTN value received from the AAF 320, the UE 310 may transmit a second authentication response message to the AAF 320 in order to transmit RES*. According to various embodiments, the second authentication response message may be transmitted using an HTTP request message. In this case, the second authentication response message may include an authorization digest header. That is, the second authentication response message in the form "authorization digest (RES*)" may be transmitted from the UE 310 to the AAF 320.

In operation 1119, the AAF 320 calculates XRES* and HXRES*. The AAF 320 may calculate XRES* and HXRES* using RES* included in the second authentication response message received from the UE 310. The UE 310 may compare whether or not the value of HXRES* matches a target value. In this case, the target value may be identified using HXRES* included in the authentication vector of the first authentication response message. The AAF 320 may verify whether or not the value of HXRES* corresponds to the target value for the user authentication of the UE 310.

In operation 1121, the AAF 320 transmits a third authentication request message to the AUSF 350. The AUSF 350 may receive the third authentication request message from the AAF 320. As it is confirmed that the calculated value of HXRES* matches the value of HXRES* received from the AUSF 350, the AAF 320 may transmit a message for transmitting RES* received from the UE 310 to the AUSF 350. Accordingly, the third authentication request message may include RES*.

In operation 1123, the AUSF 350 identifies RES*. That is, the AUSF 350 may determine whether or not the value of RES* transmitted from the UE corresponds to the value stored in the AUSF 350. The AUSF 350 may determine whether or not the authentication for the UE 310 is successful by identifying the value of RES*.

In operation 1125, the AUSF 350 transmits a third authentication response message to the AAF 320. The AAF 320 may receive the third authentication response message from the AUSF 350. If it is determined that the authentication for the UE 310 is successful, the AUSF 350 may transmit a message indicating the success of authentication to the AAF 320. In this case, the AUSF 350 transmits, to the AAF 320, a third authentication response message including a separate indicator indicating that the authentication is successful and the KAAF 320 used as an authentication key.

If the UE determines an authentication method based on a user portal, the UE may transmit, to the AAF, an authentication initiation message including the type of user agent for indicating at least one of various browsers. Alternatively, if the type of user agent included in the authentication initiation message received by the AAF indicates at least one of various browsers, the AAF may determine to perform a procedure according to the authentication method based on a user portal. Alternatively, if the AAF fails to determine an appropriate authentication method, based on the authentication initiation message, the authentication method based on a user portal may be determined. Hereinafter, an authentication procedure, in the case where the authentication method based on a user portal is determined, will be described in detail with reference to FIG. 12 and FIG. 13.

Figure 12:
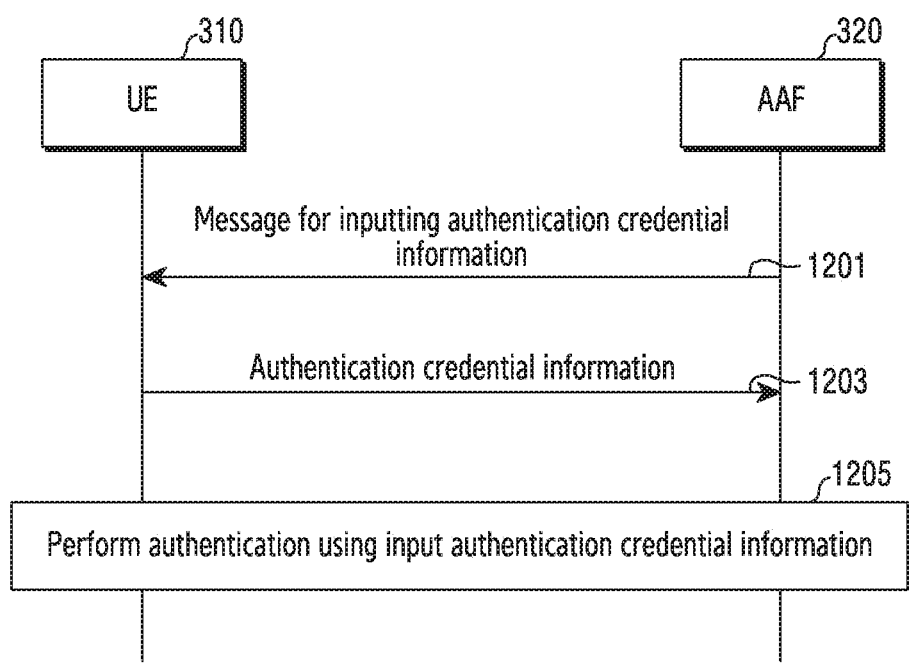
FIG. 12 illustrates a signal exchange diagram for performing an authentication procedure based on a user portal in a wireless communication system according to an embodiment of the disclosure.
Figure 13:
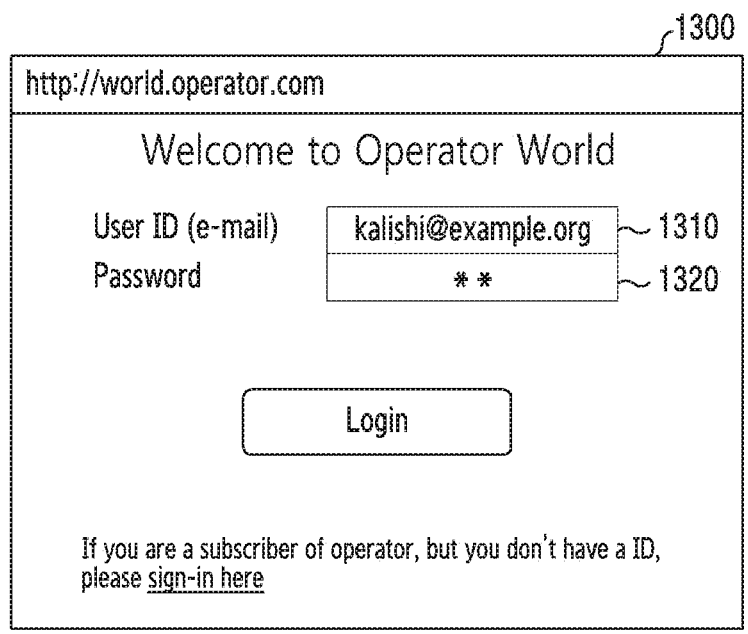
FIG. 13 illustrates an example of a user portal screen for performing an authentication procedure based on a user portal in a wireless communication system according to an embodiment of the disclosure.

FIG. 12 illustrates a signal exchange diagram for performing an authentication procedure based on a user portal in a wireless communication system according to an embodiment of the disclosure. FIG. 13 illustrates an example of a user portal screen for performing an authentication procedure based on a user portal in a wireless communication system according to an embodiment of the disclosure. The signal exchange diagram illustrated in FIG. 12 may be understood as signal flow exchanged between the UE 310 and the AAF 320. Hereinafter, a description of FIG. 12 will be made with reference to FIG. 11.

Referring to FIG. 12, in operation 1201, the AAF 320 transmits, to the UE 310, a message for inputting authentication credential information. The UE 310 may receive the message for inputting authentication credential information from the AAF 320. Specifically, the AAF 320 may transmit, to the UE 310, a message including an HTML address for displaying a screen capable of inputting credential information for authentication, such as a user ID and a password. For example, the AAF 320 may transmit, to the UE 310, an HTML address of a screen 1300 including an input field 1310 for entering a user ID and an input field 1320 for entering a password.

In operation 1203, the UE 310 may transmit authentication credential information to the AAF 320. The AAF 320 may receive the authentication credential information from the UE 310. The UE 310 may perform rendering of a received HTML file using a browser corresponding to the type of user agent indicated by the authentication initiation message, thereby displaying the screen 1300 on the display panel of the UE 310. The UE 310 may receive an input of at least one of a user ID or an email address to the input field 1310 and an input of a password to the input field 1320. The UE 310 may transmit the input user ID and password to the AAF 320 as the authentication credential information.

In operation 1205, the UE 310 and the AAF 320 perform an authentication procedure using the input authentication credential information. The UE 310 may perform an authentication procedure for verifying the user ID and the password through the interaction with a portal included in the AAF 320.

According to the embodiment of the determination of the authentication method described above, the UE and the AAF may determine to perform the authentication procedure based on an automatically generated credential. In this case, authentication information may be generated using at least one of the SUPI, the PEI, and the MSISDN, which are UE user-related information that avoids being disclosed to the public, and authentication information generated through a negotiated one-way hash function may be verified. Hereinafter, an authentication procedure according to the authentication method based on an automatically generated credential will be described in detail with reference to FIG. 14.

Figure 14:
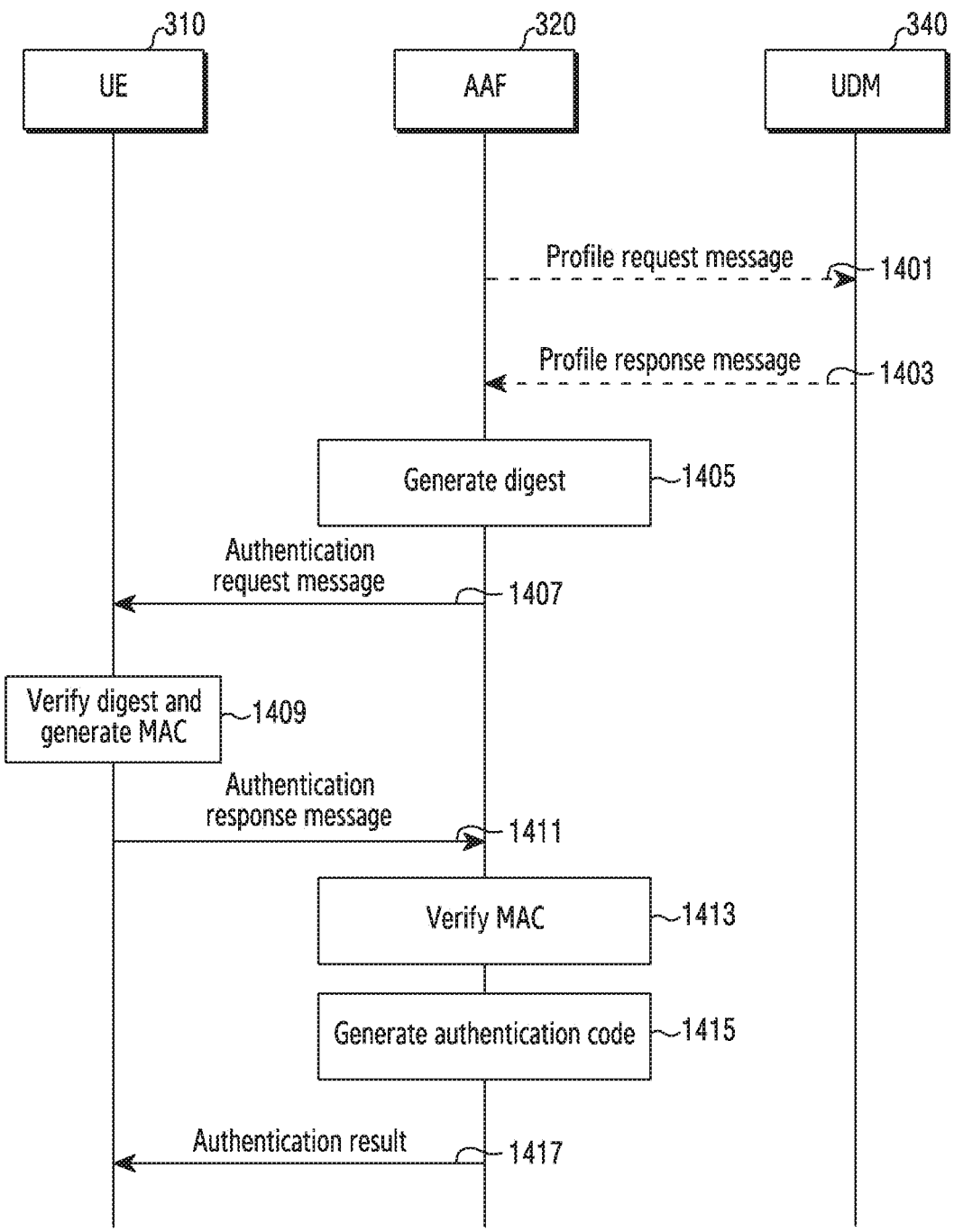
FIG. 14 illustrates a signal exchange diagram for performing an authentication procedure based on an automatically generated credential in a wireless communication system according to an embodiment of the disclosure.

FIG. 14 illustrates a signal exchange diagram for performing an authentication procedure based on an automatically generated credential in a wireless communication system according to an embodiment of the disclosure. The signal exchange diagram illustrated in FIG. 14 may be understood as signal flow exchanged between the UE 310, the AAF 320, and the UDM 340.

Referring to FIG. 14, in operation 1401, the AAF 320 transmits a profile request message to the UDM 340. The UDM 340 may receive the profile request message from the AAF 320. Specifically, the AAF 320 may select the UDM 340 for performing an authentication procedure using a UE user-related identifier and information on the type of user agent identified from the authentication initiation message received from the UE 310. The AAF 320 may make a request to the selected UDM 340 for information necessary for performing the authentication procedure based on an automatically generated credential. That is, the AAF 320 may transmit a profile request message including the UE user-related identifier to the UDM 340. For example, the AAF 320 may make a request to the UDM 340 for information necessary for performing authentication for the user of a UE corresponding to a GPSI by transmitting a profile request message including the GPSI.

In operation 1403, the UDM 340 transmits a profile response message to the AAF 320. The AAF 320 may receive the profile response message from the UDM 340. That is, the UDM 340 may transmit, to the AAF 320, a profile response message including subscriber information indicating at least one of the SUPI, the PEI, and the MSISDN corresponding to the GPSI. As described above, the SUPI, the PEI, and the MSISDN are identifiers that are not disclosed to the public, and may be used to automatically generate the credential. That is, the authentication method based on the credential generated using the information related to the UE 310 may be used.

In operation 1405, the AAF 320 produces a digest. The AAF 320 may acquire subscriber information for identifying the UE, based on the profile response message received from the UDM 340. In addition, the AAF 320 generates a random number (RAND), thereby producing a digest using the acquired subscriber information and the RAND. In this case, as described above, the subscriber information may correspond to at least one of the SUPI, the PEI, and the MSISDN, and the digest may be expressed as "Digest=H(RAND-|SUPI)".

In operation 1407, the AAF 320 transmits an authentication request message to the UE 310. The UE 310 may receive the authentication request message from the AAF 320. The authentication request message may be referred to as an "application authentication request message". That is, the AAF 320 may transmit a message for transmitting the generated digest to the UE 310. According to various embodiments, the authentication request message may be transmitted in the form of an HTTP response message. The AAF 320 may transmit an HTTP response message to the UE 310 by inserting the generated digest into the field "WWW-authenticate". In this case, the authentication request message may include a form such as "WWW-authenticate: Digest Random: RAND".

In operation 1409, the UE 310 verifies the digest and generates a message authentication code (MAC). If the digest identified from the authentication request message is verified, the UE 310 may generate a MAC using at least one of the SUPI, the PEI, the MSISDN, corresponding to the subscriber information for identifying the UE 310, or the RAND generated by the AAF 320. That is, the MAC may be expressed as "MAC=H(RAND|MSISDN|PEI|SUPI)".

In operation 1411, the UE 310 transmits an authentication response message to the AAF 320. The AAF 320 may receive the authentication response message from the UE 310. The authentication response message may be referred to as an "application authentication response message". Specifically, the UE 310 may transmit, the AAF 320, an authentication response message having the MAC, which is generated based on the verified digest, inserted thereto. According to various embodiments, the authentication response message may be transmitted in the form of an HTTP request message. In this case, the UE 310 may transmit the authentication response message to the AAF 320 by including the MAC in the header field "authorization" of the HTTP request message.

In operation 1413, the AAF 320 verifies the MAC. That is, the AAF 320 may verify that the MAC generated by the UE 310 matches the UE user-related identifier received from the UDM 340. The verification of the MAC may be performed according to any of various methods such as a method based on a hash function.

In operation 1415, the AAF 320 generates an authentication code. If the MAC is verified, the AAF 320 may determine that the authentication is successful. Accordingly, the AAF 320 may generate an authentication code that the UE 310 may use in order to acquire an access token issued for an edge application.

In operation 1417, the AAF 320 transmits an authentication result to the UE 310. The UE 310 may receive the authentication result from the AAF 320. The authentication result may be referred to as an "application authentication result message". The AAF 320 may transmit a message indicating that the authentication has been successfully performed to the UE 310. According to various embodiments, the AAF 320 may transmit a message including an authentication code to the UE 310. In addition, the AAF 320 may transmit a message further including a redirection address to the UE 310.

Figure 15:
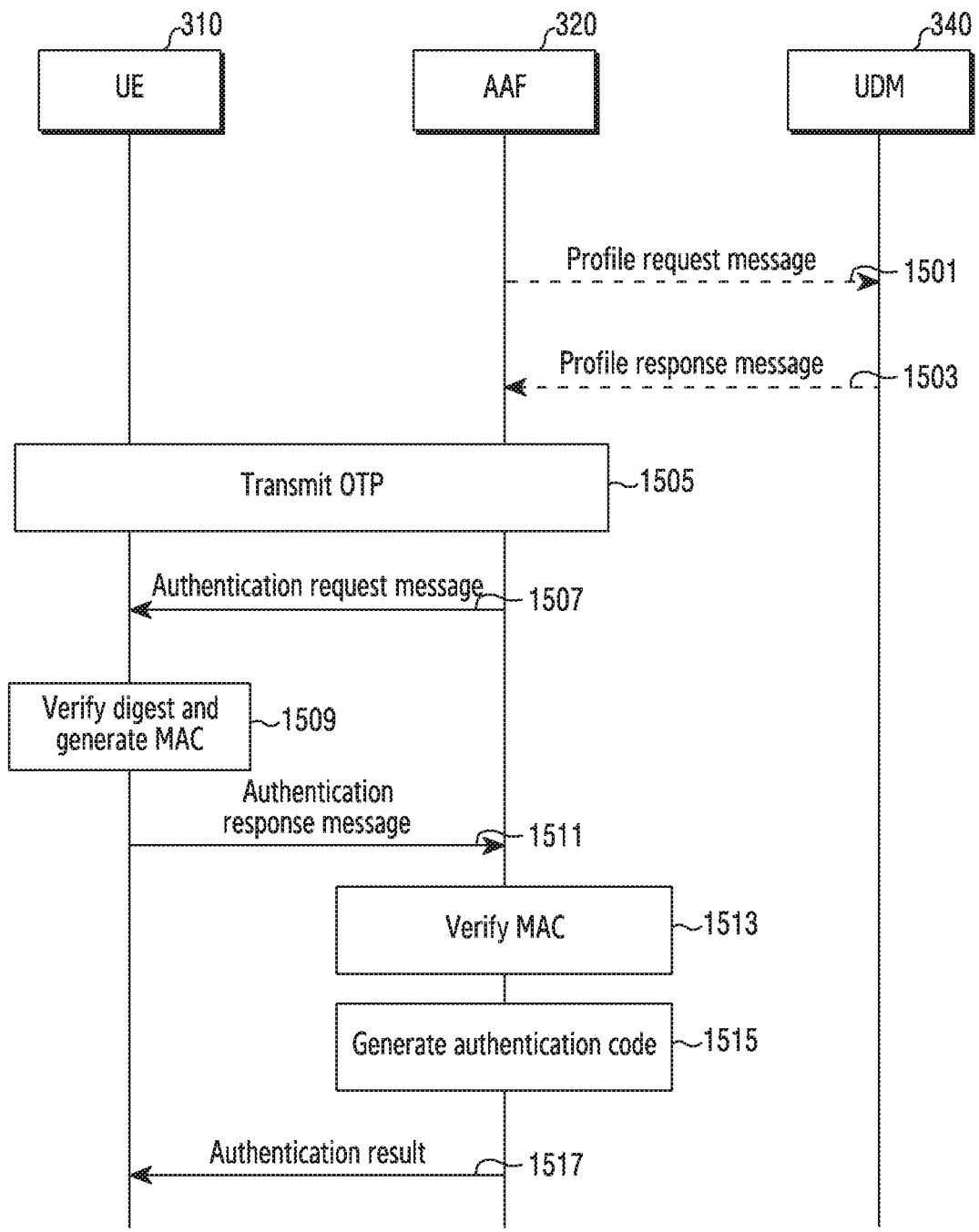
FIG. 15 illustrates a signal exchange diagram for performing an authentication procedure based on an OTP in a wireless communication system according to an embodiment of the disclosure.

FIG. 15 illustrates a signal exchange diagram for performing an authentication procedure based on an OTP in a wireless communication system according to an embodiment of the disclosure. The signal exchange diagram illustrated in FIG. 15 may be understood as signal flow exchanged between the UE 310, the AAF 320, and the UDM 340.

Referring to FIG. 15, in operation 1501, the AAF 320 transmits a profile request message to the UDM 340. The UDM 340 may receive the profile request message from the AAF 320. Specifically, the AAF 320 may select the UDM 340 for performing the authentication procedure using the information on the UE user-related identifier and the type of user agent identified from the authentication initiation message received from the UE 310. The AAF 320 may transmit a profile request message including the UE user-related identifier to the selected UDM 340. For example, the AAF 320 may transmit a profile request message including a GPSI, thereby making a request to the UDM 340 for information necessary for performing authentication on the UE user corresponding to the GPSI.

In operation 1503, the UDM 340 transmits a profile response message to the AAF 320. The AAF 320 may receive the profile response message from the UDM 340. The UDM 340 may identify at least one of the SUPI, the PEI, and the MSISDN for the UE 310, based on the received GPSI. Accordingly, the UDM 340 may transmit, to the AAF 320, a profile response message including subscriber information indicating at least one of the identified SUPI, PEI, and MSISDN.

In operation 1505, an OTP is transmitted from the AAF 320 to the UE 310. The AAF 320 may acquire subscriber information for identifying the UE, based on the profile response message received from the UDM 340. In this case, as described above, the subscriber information may correspond to at least one of the SUPI, the PEI, and the MSISDN. The AAF 320 may transmit a one-time password (OTP) to the UE 310 corresponding to at least one of the acquired SUPI, PEI, and MSISDN through a separate path. For example, the AAF 320 may transmit an OTP to the UE 310 corresponding to the acquired subscriber information through a short message service (SMS). For example, the AAF 320 may transmit an OTP to the UE 310 corresponding to the acquired subscriber information through a NAS message.

In operation 1507, the AAF 320 transmits an authentication request message to the UE 310. The UE 310 may receive the authentication request message from the AAF 320. The authentication request message may be referred to as an "application authentication request message". That is, receiving a request for initiating an authentication procedure from the UE 310, the AAF 320 may transmit an authentication request message, as a response message, after a predetermined procedure. In this case, the AAF 320 generates a random number (RAND) available for verification of the message authentication code (MAC), and may transmit an authentication request message including the generated RAND to the UE 310.

In operation 1509, the UE 310 generates a MAC. The UE 310 may generate a MAC using at least one of the SUPI, the PEI, the MSISDN, corresponding to the subscriber information for identifying the UE 310, the RAND generated by the AAF 320, and the received OTP value. That is, the MAC may be expressed as "MAC=H (OTP, RAND|MSISDN-|PEI|SUPI)".

In operation 1511, the UE 310 transmits an authentication response message to the AAF 320. The AAF 320 may receive the authentication response message from the UE 310. The authentication response message may be referred to as an "application authentication response message". Specifically, the UE 310 may transmit, to the AAF 320, an authentication response message having the MAC, which is generated based on at least one of the aforementioned subscriber information, the RAND, and the OTP value, inserted thereto.

In operation 1513, the AAF 320 verifies the MAC. The AAF 320 may generate the MAC, based on at least one of the subscriber information received from the UDM 340 through the profile response message, the RAND generated by the AAF 320, and the OTP value sent to the UE 310. In addition, the AAF 320 may identify the MAC, which is generated by the UE 310, from the authentication response message received from the UE 310. Accordingly, the AAF 320 may verify the MAC generated by the UE 310 using the MAC generated by the AAF 320.

In operation 1515, the AAF 320 generates an authentication code. If it is determined that the authentication is successful through the verification of the MAC, the AAF 320 may generate an authentication code. According to various embodiments, the AAF 320 may generate an authentication code according to OAUTH2 framework, which is protocol for managing authentication for a third party and the grant of authorization thereto using a token. That is, the AAF 320 may generate an authentication code available for the UE 310 to receive an access token issued for an edge application.

In operation 1517, the AAF 320 transmits an authentication result to the UE 310. The UE 310 may receive the authentication result from the AAF 320. The authentication result may be referred to as an "application authentication result message". The AAF 320 may transmit, to the UE 310, a message indicating that the authentication has been successfully performed. According to various embodiments, the AAF 320 may transmit a message including an authentication code to the UE 310. In addition, the AAF 320 may transmit a message that further includes a redirection address to the UE 310.

If the authentication code is acquired by performing the authentication procedure described above, the UE may perform a procedure for acquiring an access token using the acquired authentication code. Hereinafter, a procedure of acquiring an access token will be described in detail with reference to FIG. 16 and FIG. 17.

Figure 16:
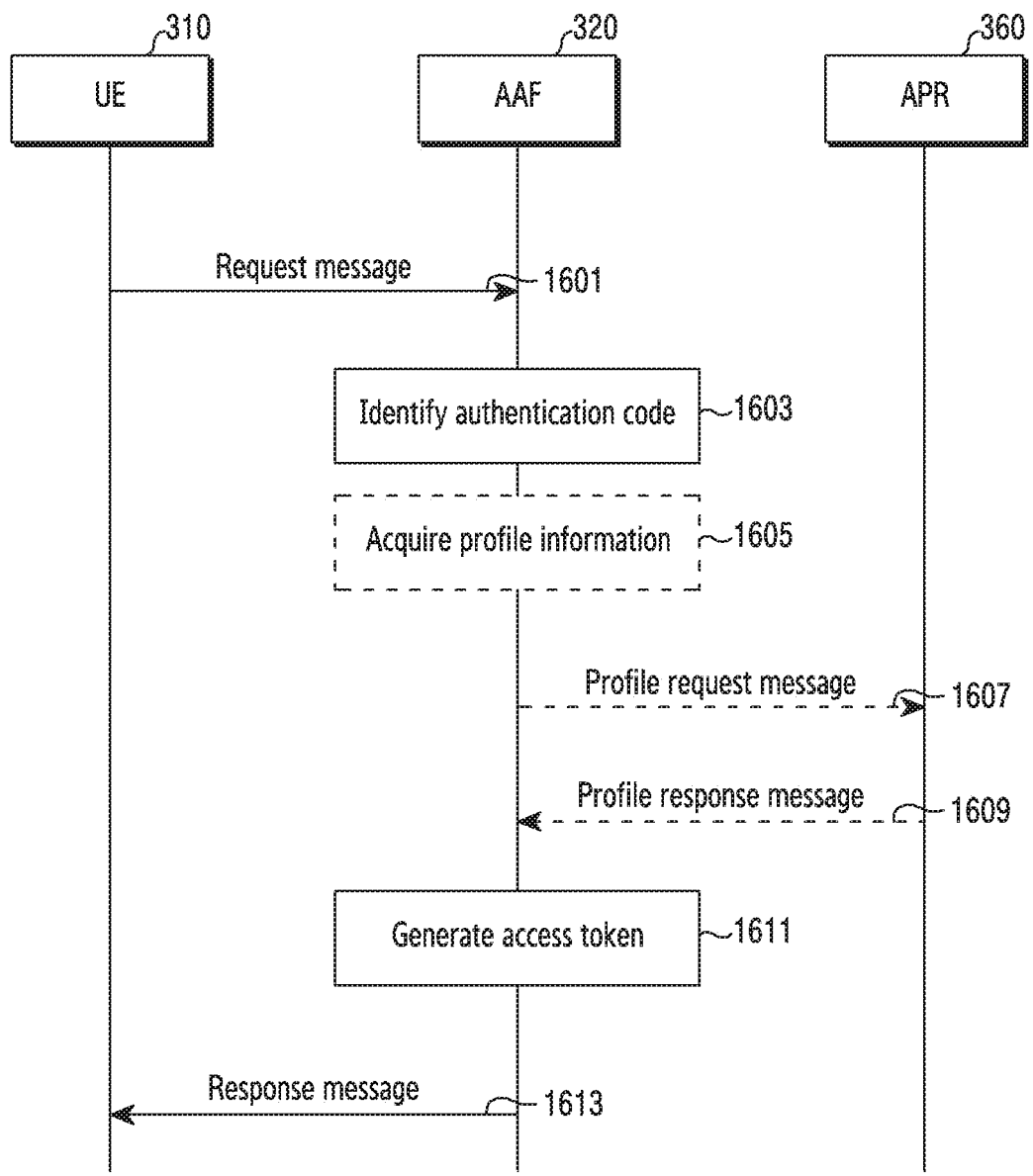
FIG. 16 illustrates a signal exchange diagram in the case where generation of an access token is successful in a wireless communication system according to an embodiment of the disclosure.

FIG. 16 illustrates a signal exchange diagram in the case where generation of an access token is successful in a wireless communication system according to an embodiment of the disclosure. The signal exchange diagram illustrated in FIG. 16 may be understood as signal flow exchanged between the UE 310, the AAF 320, and the APR 360.

Referring to FIG. 16, in operation 1601, the UE 310 transmits a request message to the AAF 320. The AAF 320 may receive the request message from the UE 310. That is, the UE 310 may transmit a message for requesting an access token to the AAF 320 after the authentication procedure is successfully performed. According to various embodiments, the request message may include at least one of a grant type, an authentication code, a redirection address, and a client ID. The request message may be referred to as an "access token request message".

In operation 1603, the AAF 320 checks the authentication code. The AAF 320 may identify the authentication code, based on the received request message. The AAF 320 may verify the validity of the identified authentication code, based on at least one predetermined criterion. For example, the validity of the authentication code may be determined based on at least one of a valid time of the authentication code, a GPSI identified in the authentication code, or information, which is included in the request message, other than the authentication code.

In operation 1605, the AAF 320 acquires profile information. If the validity of the authentication code is verified, the AAF 320 may acquire a subscriber profile corresponding to the verified authentication code. According to various embodiments, the subscriber profile may include information for identifying the user of the UE 310 requesting the issue of the access token (e.g., a UE user-related identifier) and subscriber information corresponding to the user (e.g., a subscriber level, a subscriber category, and the like). Although not shown in FIG. 16, the AAF 320 may make a request to the UDM for a subscriber profile, thereby acquiring information on the UE 310 or the user requesting the issue of the access token.

In operation 1607, the AAF 320 transmits a profile request message to the APR 360. The APR 360 may receive the profile request message from the AAF 320. The profile request message may be referred to as an "application profile request message". That is, the AAF 320 may transmit, to the APR 360, a message requesting a profile on at least one edge application. In this case, profile information on the edge application for which the issue of the access token is requested by the UE 310 is requested. According to various embodiments, the profile request message may include at least one of the identifier of an application profile (an application profile ID) or the category of the corresponding application profile.

In operation 1609, the APR 360 transmits a profile response message to the AAF 320. The AAF 320 may receive the profile response message from the APR 360. The profile response message may be referred to as an "application profile response message". The APR 360 may identify whether or not the application profile requested by the profile request message is allowed based on pre-stored information on edge applications. At least one application profile may be requested from the AAF 320, and the APR 360 may retrieve or identify allowable application profiles, based on the policy related to applications. Accordingly, the APR 360 may transmit, to the AAF 320, a profile response message including information indicating at least one of allowable application profiles or unallowable application profiles.

In operation 1611, the AAF 320 generates an access token. The AAF 320 may acquire an allowable application profile, based on the profile response message received from the APR 360. The AAF 320 may generate an access token by configuring the authority according to the acquired subscriber profile. According to various embodiments, the access token includes at least one of a UE user-related identifier (e.g., a subscriber identifier or an identifier of a UE device), an identifier of an application profile, a subscriber category, a subscriber level, and information for identifying the AAF 320 for verifying the access token. The information for identifying the AAF 320 for verifying the access token may include at least one of the address of an AAF 320 end point, the identifier of an application provider, and an AAF 320 ID.

In operation 1613, the AAF 320 transmits a response message to the UE 310. The UE 310 may receive the response message from the AAF 320. Specifically, after encrypting the generated access token, the AAF 320 may transmit a response message for delivering the encrypted access token to the UE 310. Accordingly, the access token may be used to determine whether or not to permit the UE 310 to use an edge computing service corresponding to the application profile. The response message may be referred to as an "access token response message".

Figure 17:
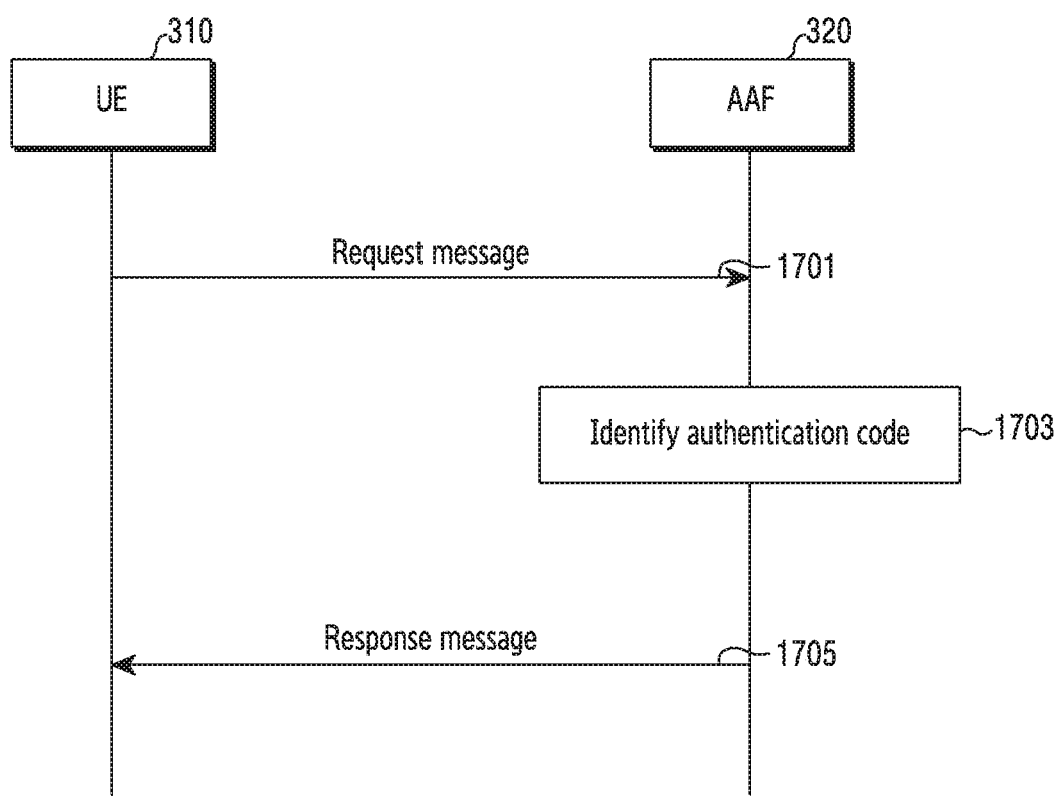
FIG. 17 illustrates a signal exchange diagram in the case where generation of an access token fails in a wireless communication system according to an embodiment of the disclosure.

FIG. 17 illustrates a signal exchange diagram in the case where generation of an access token fails in a wireless communication system according to an embodiment of the disclosure. The signal exchange diagram illustrated in FIG. 17 may be understood as signal flow exchanged between the UE 310 and the AAF 320.

Referring to FIG. 17, in operation 1701, the UE 310 transmits a request message to the AAF 320. The AAF 320 may receive the request message from the UE 310. That is, the UE 310 may transmit a message requesting an access token to the AAF 320 after the authentication procedure is successful. According to various embodiments, the request message may include at least one of an authorization type, an authentication code, a redirection address, and a client ID. The request message may be referred to as an "access token request message".

In operation 1703, the AAF 320 verifies an authentication code. The AAF 320 may identify an authentication code, based on the received request message. The AAF 320 may determine whether or not to generate an access token using information identified from the request message. For example, if the validity time of an authentication code has elapsed, if the GPSI identified from the authentication code does not match the GPSI received from the UDM, or if the client ID included in the request message does not match, the AAF 320 may determine not to generate an access token. In addition, if the profile information received from the UDM is determined to be invalid, the AAF 320 may determine not to generate an access token.

In operation 1705, the AAF 320 transmits a response message to the UE 310. The UE 310 may receive the response message from the AAF 320. That is, the AAF 320 may transmit, to the UE 310, a message indicating that the access token has not been generated. For example, the response message may include at least one of information on the reason for rejecting the authentication code and a redirection address. That is, the AAF 320 may transmit the reason for rejecting the authentication code to the UE 310 through the response message. In addition, the AAF 320 may transmit the redirection address that may be determined according to the reason for rejecting the authentication code through the response message. The response message may be referred to as an "access token response message".

Figure 18:
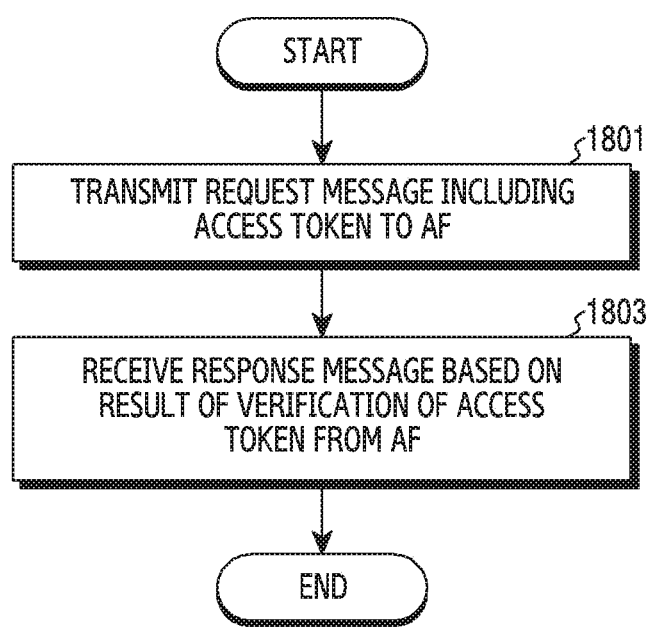
FIG. 18 illustrates a flowchart of a UE for granting authorization for an edge application in a wireless communication system according to an embodiment of the disclosure.

FIG. 18 illustrates a flowchart of a UE for granting authorization for an edge application in a wireless communication system according to an embodiment of the disclosure. FIG. 18 illustrates an operation method of the UE 310.

Referring to FIG. 18, in operation 1801, the UE transmits a request message including an access token to the AF. That is, if the access token is received from the AAF according to the successful verification of the authentication code, the UE may transmit, to the AF, a request message for requesting authorization for an edge application. In this case, the UE may transmit an access token to the AF through the request message. The access token may include at least one of a UE user-related identifier (e.g., a subscriber identifier or an identifier of a UE device), an identifier of an application profile, a subscriber category, a subscriber level, and information for identifying an AAF for verifying the access token.

In operation 1803, the UE receives a response message based on the result of the verification of the access token from the AF. Specifically, the AF may identify the AAF for verifying the access token, based on the received access token. The AF may transmit, to the identified AAF, a message including the access token and information requesting authorization for an edge application. If the verification of the access token by the AAF is successful, the AF receives, from the AAF, at least one of information on allowable authority for an edge application corresponding to the information included in the access token or an allowable application profile. Accordingly, the UE may receive, from the AF, a response message including information on the edge application permitted according to at least one of the subscriber category and the subscriber level related to the UE. According to various embodiments, the information on the edge application may include the address of an application server corresponding to the edge application. For example, the address of an application server may include at least one of an FQDN, an Internet protocol (IP) address, or an address of an edge computing service endpoint. If the verification of the access token by the AAF fails, the AF receives, from the AAF, a verification response message indicating the reason for failure of the verification of the access token. Accordingly, the UE may receive, from the AF, a response message including at least one of information indicating the reason for failure of the verification of the access token and a redirection address for re-performing the authentication procedure for acquiring a valid access token.

Figure 19:
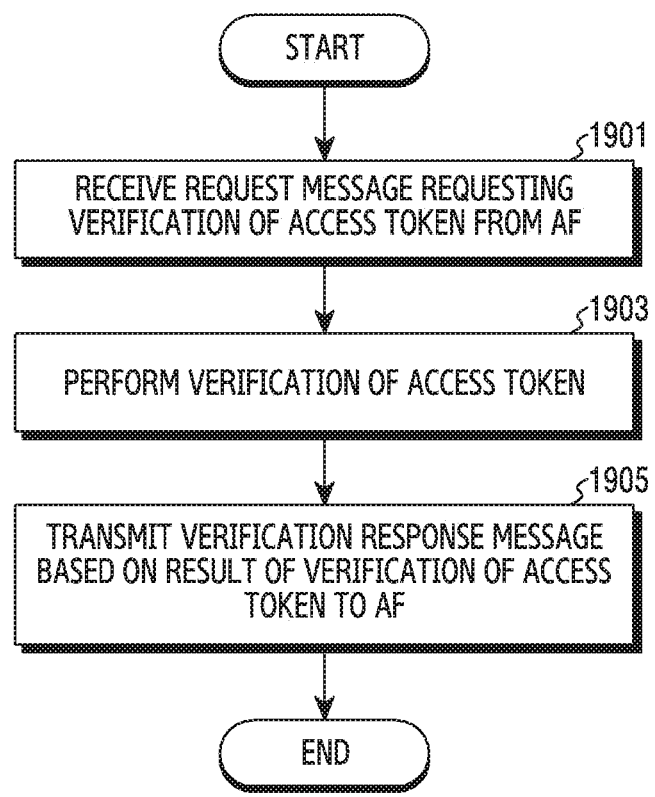
FIG. 19 illustrates a flowchart of an AAF for granting authorization for an edge application in a wireless communication system according to an embodiment of the disclosure.

FIG. 19 illustrates a flowchart of an AAF for granting authorization for an edge application in a wireless communication system according to an embodiment of the disclosure. FIG. 19 illustrates an operation method of the AAF 320.

Referring to FIG. 19, in operation 1901, the AAF receives a request message requesting verification of an access token from the AF. Specifically, the AF may identify the AAF for verifying the access token, based on the access token included in the request message received from the UE. The AAF may receive, from the AF, a verification request message including an access token and information for requesting authorization for an edge application. That is, the AAF may receive, from the AF, a message requesting verification of the access token after being identified by the AF.

In operation 1903, the AAF performs verification of the access token. The AAF may verify the access token, based on at least one of a validity time of the access token and information related to the authority of the access token. For example, the AAF may identify whether or not the validity time of the access token has elapsed at the time of performing the verification. If the validity time has not yet elapsed, the AAF may determine that the verification of the access token is successful. If the validity time has elapsed, the AAF may determine that the verification of the access token has failed. In addition, the AAF may identify whether or not at least one of the resource permitted by the access token or the resource requested by the UE belongs to the authority of the access token. If at least one of the resource permitted by the access token or the resource requested by the UE belongs to the authority of the access token, the AAF may determine that the verification of the access token is successful. If at least one of the resource permitted by the access token or the resource requested by the UE does not belong to the authority of the access token, the AAF may determine that the verification of the access token has failed.

In operation 1905, the AAF transmits a verification response message based on the result of verification of the access token to the AF. That is, the AAF may transmit, to the AF, a response message indicating the result of verification of the access token. If it is determined that the verification of the access token is successful, the AAF may transmit, to the AF, the verification response message including at least one of information on allowable authority for an edge application corresponding to the information included in the access token or an allowable application profile. If it is determined that the verification of the access token has failed, the AAF may transmit, to the AF, a verification response message indicating the reason why the verification of the access token has failed. In this case, the reason for failure of the verification, such as the case where the access token is invalid due to the elapse of the valid time or the case where the requested resource does not belong to the authority of the access token, may be transmitted to the AF.

Figure 20:
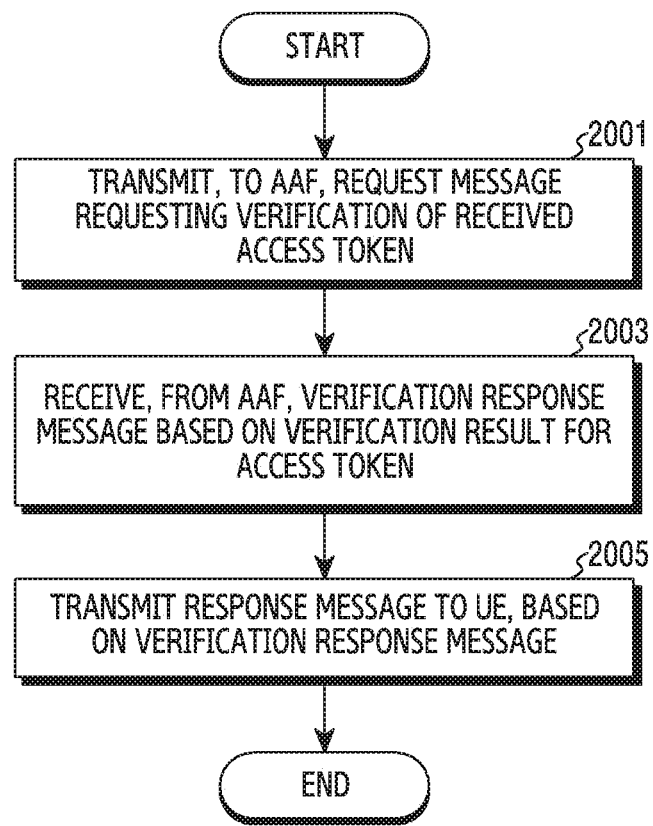
FIG. 20 illustrates a flowchart of an application function (AF) for granting authorization for an edge application in a wireless communication system according to an embodiment of the disclosure.

FIG. 20 illustrates a flowchart of an AF for granting authorization for an edge application in a wireless communication system according to an embodiment of the disclosure. FIG. 20 illustrates an operation method of the AF 330.

Referring to FIG. 20, in operation 2001, the AF transmits, to the AAF, a request message requesting verification of the received access token. Specifically, the AF may identify the AAF for verifying the access token, based on the information for identifying the AAF for verifying the access token, which is included in the access token received from the UE. According to various embodiments, the information for identifying the AAF for verifying the access token may include at least one of the address of an AAF endpoint, the identifier of an application provider, and an AAF ID. For example, if the access token has the format of a JSON web token (JWT), the field "issuer ID", which is identification information of a token issuer, may include information determined based on the identifier of an application provider and the AAF ID, and the field "issued at (IAT)", which is information indicating the issue time of the token, may include the address of the AAF endpoint. Accordingly, the AF may transmit a verification request message including the access token and authorization request information to the identified AAF.

In operation 2003, the AF receives, from the AAF, a verification response message, based on the verification result of the access token. That is, the AF may receive a response message indicating the verification result of the access token from the AAF. If it is determined that the verification of the access token is successful, the AF may receive, from the AAF, a verification response message including at least one of information on allowable authority for an edge application corresponding to the information included in the access token or an allowable application profile. If it is determined that the verification of the access token has failed, the AF may receive, from the AAF, a verification response message indicating the reason why the verification of the access token has failed. In this case, the reason for failure of the verification, such as the case where the access token is invalid due to the elapse of the valid time or the case where the requested resource does not belong to the authority of the access token, may be transmitted to the AF.

In operation 2005, the AF transmits a response message to the UE, based on the verification response message. If the verification of the access token by the AAF is successful, the AF may receive, from the AAF, a verification response message indicating that the verification is successful, and may then transmit, to the UE, a response message including information on the edge application that is permitted according to at least one of a subscriber category and a subscriber level in relation to the UE. According to various embodiments, the information on the edge application may include the address of an application server corresponding to the edge application. For example, the address of an application server may include at least one of an FQDN, an IP address, or the address of an edge computing service endpoint. As described above, if the verification of the access token is successful, the verification response message may include at least one of information on allowable authority for an edge application corresponding to the information included in the access token or an allowable application profile. If the verification of the access token by the AAF fails, the AF may receive, from the AAF, a verification response message indicating the reason for failure of the verification of the access token, and may then transmit, to the UE, a response message including at least one of information indicating the reason for failure of the verification of the access token and a redirection address for re-performing the authentication procedure for acquiring a valid access token.

Figure 21:
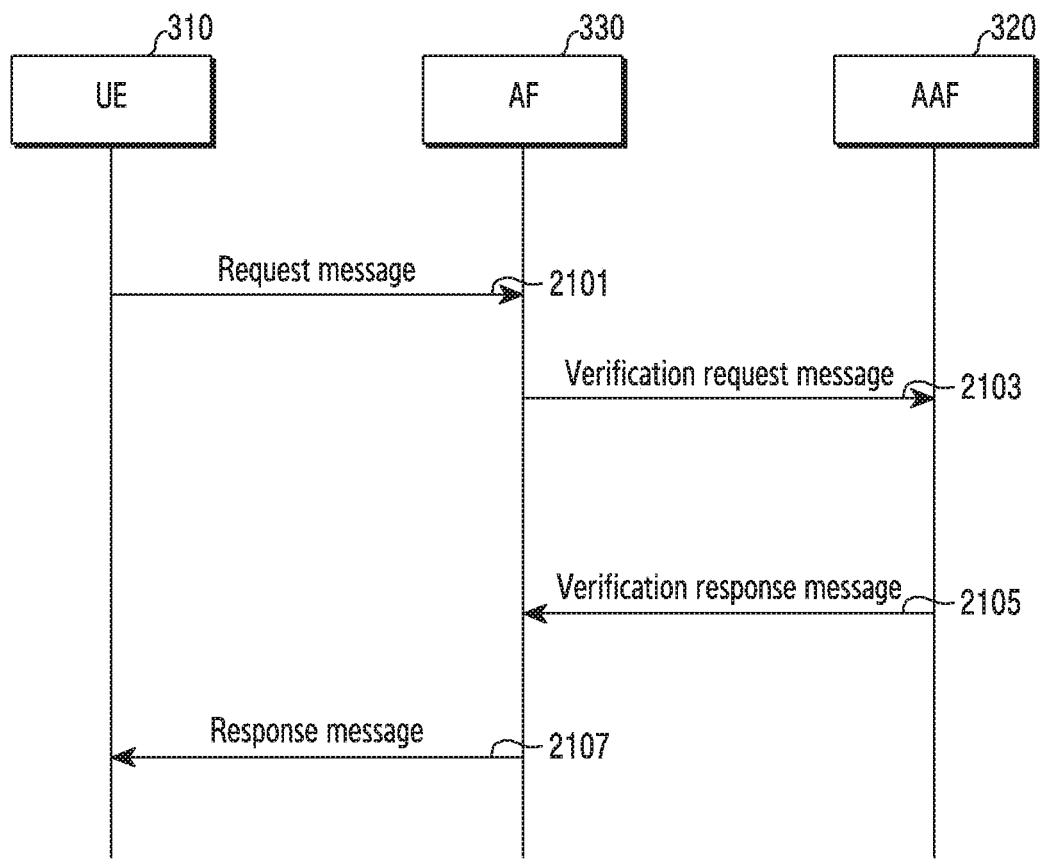
FIG. 21 illustrates a signal exchange diagram for granting authorization for an edge application in a wireless communication system according to an embodiment of the disclosure.

FIG. 21 illustrates a signal exchange diagram for granting authorization for an edge application in a wireless communication system according to an embodiment of the disclosure. The signal exchange diagram illustrated in FIG. 21 may be understood as signal flow exchanged between the UE 310, the AAF 320, and the AF 330.

Referring to FIG. 21, in operation 2101, the UE 310 transmits a request message to the AF 330. The AF 330 may receive the request message from the UE 310. The request message may be referred to as an "application request message". That is, if the access token is received from the AAF 320 according to the successful verification of the authentication code, the UE 310 may transmit, to the AF 330, a request message requesting authorization for an edge application. In this case, the UE 310 may transmit an access token to the AF 330 through the request message. The access token may include at least one of a UE user-related identifier (e.g., a subscriber identifier or an identifier of a UE device), an identifier of an application profile, a subscriber category, a subscriber level, and information for identifying the AAF 320 for verifying the access token.

In operation 2103, the AF 330 transmits a verification request message to the AAF 320. The AAF 320 may receive the verification request message from the AF 330. Specifically, the AF 330 may identify the AAF 320 for verifying the access token, based on the information for identifying the AAF 320 for verifying the access token, which is included in the access token received from the UE 310. The verification request message may be referred to as an "access token verification request message". According to various embodiments, the information for identifying the AAF 320 for verification of the access token may include at least one of the address of an AAF 320 endpoint, the identifier of an application provider, and an AAF 320 ID. For example, if the access token has the format of a JWT, the field "issuer ID", which is identification information of a token issuer, may include information determined based on the identifier of an application provider and the AAF 320 ID, and the field "issued at (IAT)", which is information indicating the issue time of the token, may include the address of the AAF endpoint. Accordingly, the AF 330 may transmit a verification request message including the access token and authorization request information to the identified AAF 320.

In operation 2105, the AAF 320 transmits a verification response message to the AF 330. The AF 330 may receive the verification response message from the AAF 320. That is, the AAF 320 may transmit, to the AF 330, a response message indicating a verification result of the access token. The verification response message may be referred to as an "access token verification response message". If it is determined that the verification of the access token is successful, the AAF 320 may transmit, to the AF 330, a verification response message including at least one of information on allowable authority for an edge application corresponding to the information included in the access token or an allowable application profile. If it is determined that the verification of the access token has failed, the AAF 320 may transmit, to the AF 330, a verification response message indicating the reason why the verification of the access token has failed. In this case, the reason for failure of the verification, such as the case where the access token is invalid due to the elapse of the valid time or the case where the requested resource does not belong to the authority of the access token, may be transmitted to the AF 330.

In operation 2107, the AF 330 transmits a response message to the UE 310. The UE 310 may receive the response message from the AF 330. The response message may be referred to as an "application response message". If the verification of the access token by the AAF 320 is successful, the AF 330 may receive, from the AAF 320, a verification response message indicating that the verification is successful, and may then transmit, to the UE 310, a response message including information on the edge application that is permitted according to at least one of a subscriber category and a subscriber level in relation to the UE 310. According to various embodiments, the information on the edge application may include the address of an application server corresponding to the edge application. For example, the address of an application server may include at least one of an FQDN, an IP address, or the address of an edge computing service endpoint. As described above, if the verification of the access token is successful, the verification response message may include at least one of information on allowable authority for an edge application corresponding to the information included in the access token or an allowable application profile. If the verification of the access token by the AAF 320 fails, the AF 330 may receive, from the AAF 320, a verification response message indicating the reason for failure of the verification of the access token, and may then transmit, to the UE, a response message including at least one of information indicating the reason for failure of the verification of the access token and a redirection address for re-performing the authentication procedure for acquiring a valid access token.

As described in FIG. 18 to FIG. 21, based on the information included in the access token, different edge computing services may be provided to respective UEs or UE users. That is, the AF may transmit, to the UE, information to provide differentiated edge computing services depending on application profiles, subscriber categories, subscriber classes, and the like in order to permit the use of the edge computing services. For example, if the AF receives a request for an edge application list from the UE, the AF may perform verification of the access token, and may determine the edge application list available for the UE, based on the subscriber categories received from the AAF. An example of a list of available edge applications for respective subscriber classes is shown in Table 2 below.

TABLE 2

| Subscriber classes | Available edge applications |
| --- | --- |
| class A | APP 1 and APP 2 |
| class B | APP 1 and APP 2 |
| class C | APP 1 |

Referring to Table 2, APP 1 and APP 2 may be permitted to be used for the subscriber belonging to subscriber class A. In addition, APP 1 and APP 2 may be permitted to be used for the subscriber belonging to subscriber class B. Further, only APP 1, instead of APP 2, may be permitted to be used for the subscriber belonging to subscriber class C. That is, different edge applications may be provided depending on the subscriber classes.

In addition, if information on the available edge application is transmitted to the UE, and if a request for the address of an application server of the edge application is received from the UE, the AF may transmit different addresses for the application, based on the subscriber categories and the subscriber classes. An example of addresses of an application server of the edge application is shown in Table 3 below.

TABLE 3

| Edge applications | FQDN | Class A | Class B |
| --- | --- | --- | --- |
| APP 1 | ex.app1.com | fast.app1.com | slow.app1.com |
| APP 2 | svc.app2.com | fast.app2.com | slow.app2.com |

Referring to Table 3, in the case of APP 1, if an FQDN is requested as the address of an application server, the address "ex.app1.com" may be provided. In addition, the address "fast.app1.com" may be provided to the UE in the case of subscriber class A, and the address "slow.app1.com" may be provided to the UE in the case of subscriber class B. That is, edge application APP 1 may be provided at different speeds depending on the subscriber classes. Likewise, in the case of APP 2, if the FQDN is requested as the address of the application server, the address "svc.app2.com" may be provided. In addition, the address "fast.app2.com" may be provided to the UE in the case of subscriber class A, and the address "slow.app2.com" may be provided to the UE in the case of subscriber class B. That is, edge application APP 2 may be provided at different speeds depending on the subscriber classes.

Hereinafter, an embodiment of user consent and utilization of personal information in the case where personal information on the user is requested to provide edge computing services will be described in detail with reference to FIG. 22 and FIG. 23.

Figure 22:
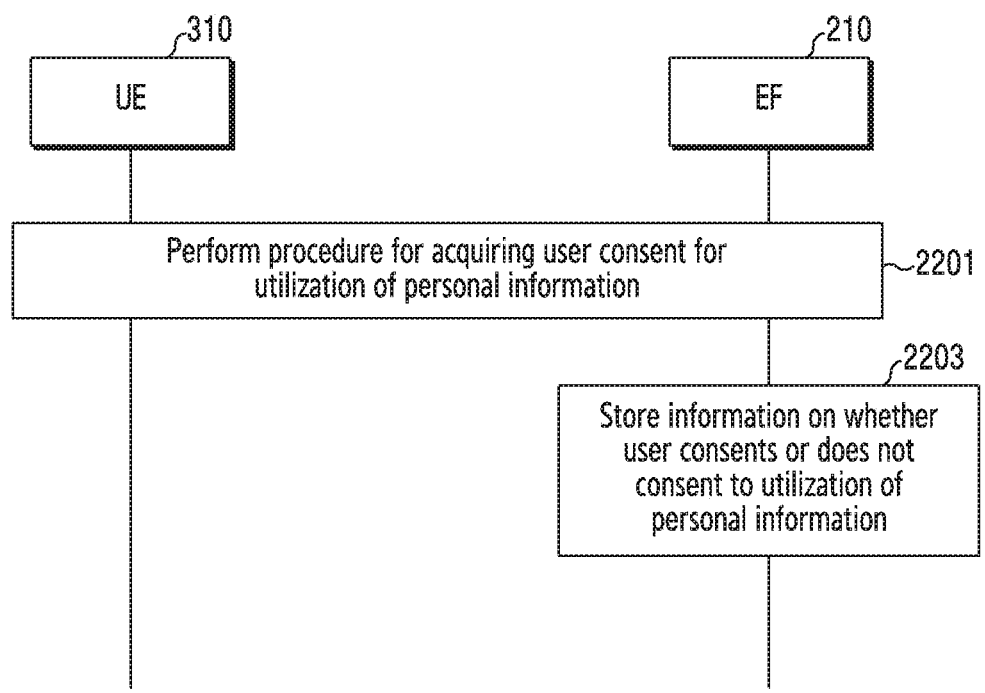
FIG. 22 illustrates a signal exchange diagram for acquiring user consent to utilization of personal information in a wireless communication system according to an embodiment of the disclosure.

FIG. 22 illustrates a signal exchange diagram for acquiring user consent for utilization of personal information in a wireless communication system according to an embodiment of the disclosure. The signal exchange diagram illustrated in FIG. 22 may be understood as signal flow exchanged between the UE 310 and the EF 210.

Referring to FIG. 22, in operation 2201, the UE 310 and the EF 210 perform a procedure of acquiring user consent for utilization of personal information. For example, personal information on the user may be requested by a client, that is, an external user agent, while the authentication procedure described above is performed or after the authentication procedure is completed. That is, a request for consent to grant authority for the personal information is made to the user of the UE 310 requesting edge computing services. The personal information on the user may include a variety of information such as location information of the UE 310.

In operation 2203, the EF 210 stores information on the user's consent or denial. The EF 210 may store information on whether or not the user consents to the utilization of the personal information. The information on the user's consent or denial may be maintained for the validity period of the authentication result acquired through the authentication procedure described above. If the validity period during which the authentication result remains valid expires, the EF 210 may delete the information on the user's consent or denial.

Figure 23:
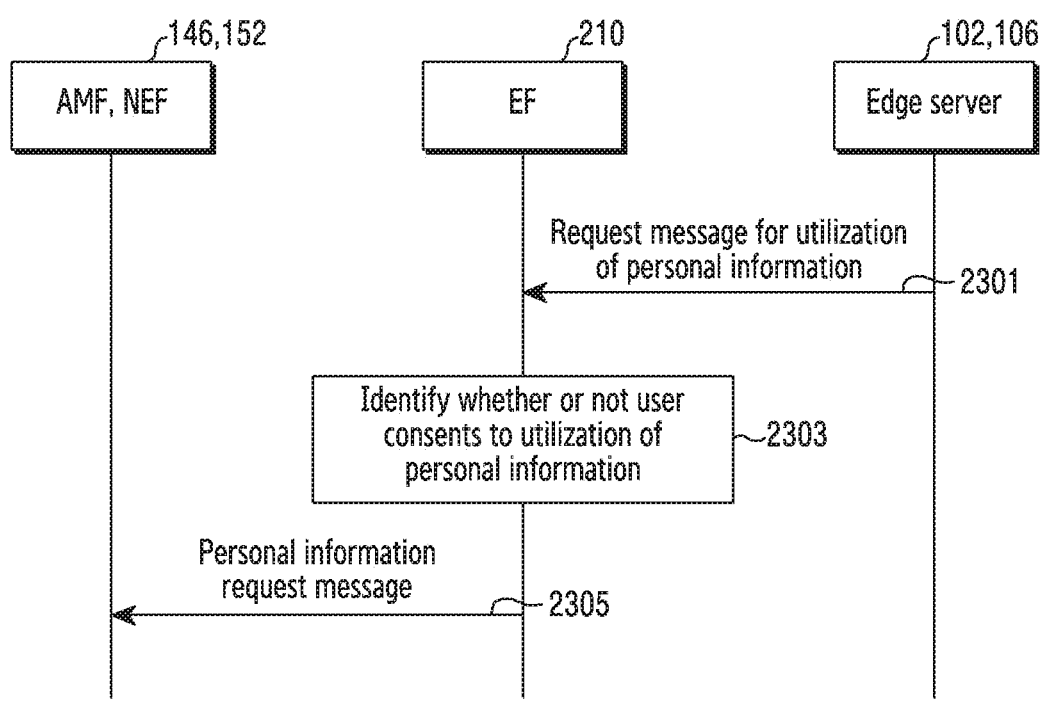
FIG. 23 illustrates a signal exchange diagram for utilizing personal information in a wireless communication system according to an embodiment of the disclosure.

FIG. 23 illustrates a signal exchange diagram for utilizing personal information in a wireless communication system according to an embodiment of the disclosure. The signal exchange diagram illustrated in FIG. 23 may be understood as signal flow exchanged between the AMF 146/NEF 152, the EF 204 or 210, and the edge server 102 or 106.

Referring to FIG. 23, in operation 2301, the edge server 102 or 106 transmits a request message for utilization of personal information to the EF 204 or 210. The EF 204 or 210 receives the request message for utilization of personal information from the edge server 102 or 106. The edge server 102 or 106 providing edge applications to the UE may transmit a message requesting utilization of personal information regarding the user of a corresponding UE to the EF 204 or 210.

In operation 2303, the EF 204 or 210 identifies whether or not the user consents to utilization of personal information. As described in FIG. 22, the EF 204 or 210 may identify whether or not the user consents to utilization of the requested personal information, based on the information about the user's consent or denial, which is pre-stored. In this case, the EF 204 or 210 may identify availability of the requested personal information before the validity period during which the authentication result remains valid expires.

In operation 2305, the EF 204 or 210 transmits a personal information request message to the AMF 146 and the NEF 152. The AMF 146 and the NEF 152 receive the personal information request messages from the EF 204 or 210. If it is confirmed that the user consents to the utilization of the requested personal information, based on the information on the user's consent or denial, the EF 204 or 210 may transmit, to the AMF 146 and the NEF 152, a request message for acquiring the current state of the corresponding personal information. That is, the EF 204 or 210 may acquire the current valid information on the functions (e.g., positioning of the UE) to which the user consents. Although the AMF 146 and the NEF 152 are described in FIG. 23, additional entities may receive the request message according to the type of requested personal information. For example, if the edge server 102 or 106 requests location information on the UE, the EF 204 or 210 may transmit a message requesting the current location information of the UE to location services (LCS), as well as the AMF 146 and the NEF 152.

Figure 24:
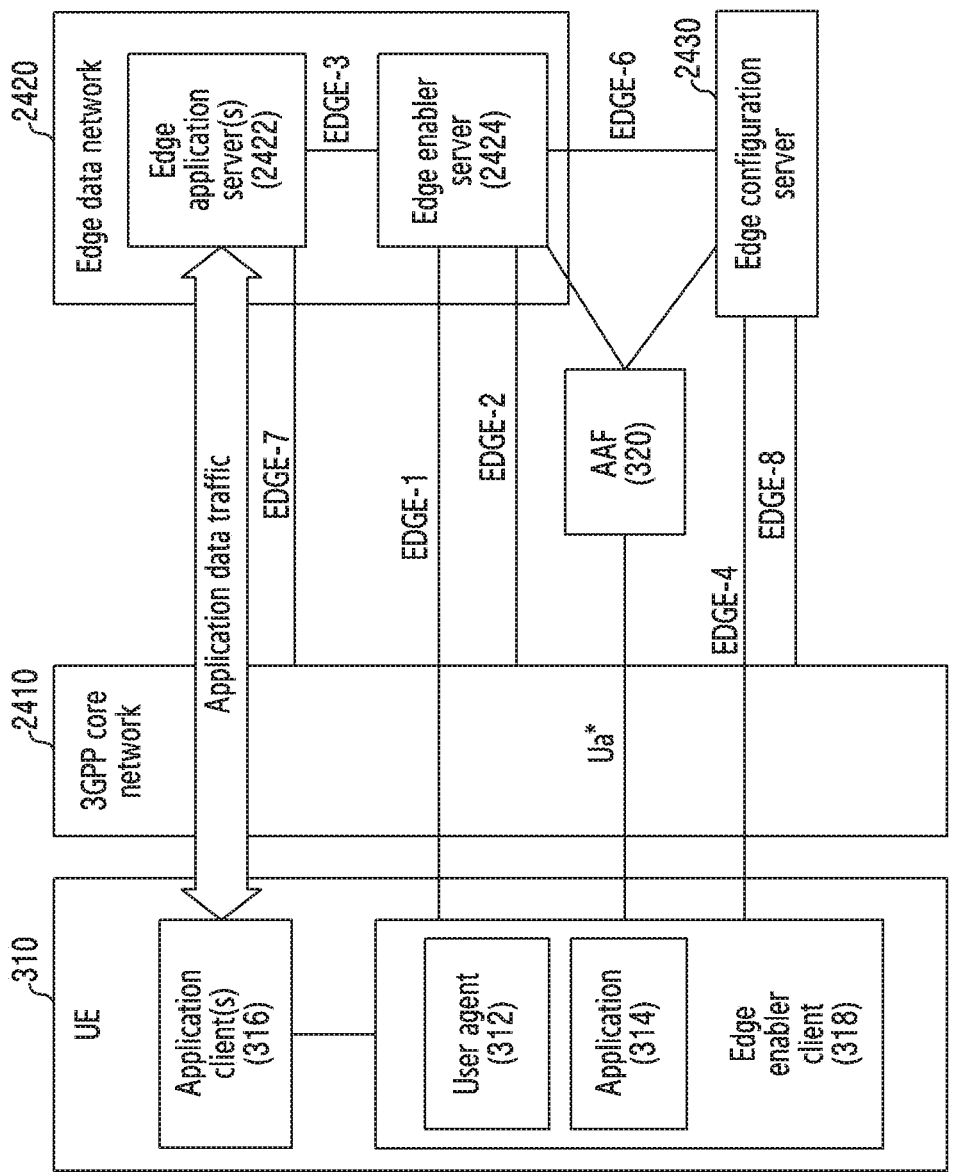
FIG. 24 illustrates a network structure in which a structure for authentication and authorization for an edge application is mapped to an edge computing structure in a wireless communication system according to an embodiment of the disclosure.

FIG. 24 illustrates a network structure in which a structure for authentication and authorization for an edge application is mapped to an edge computing structure in a wireless communication system according to an embodiment of the disclosure.

Specifically, FIG. 24 illustrates a network structure in which the entities of various embodiments are mapped to an edge computing structure.

Referring to FIG. 24, an edge enabler client (EEC) 318 may be a software module including both a user agent 312 and an application 314. Alternatively, the EEC 318 in a UE 310 may be a software module including the user agent 312.

The edge enabler client 318 may be identified using an EEC identifier. The EEC identifier may be a value derived from the identifier of a subscriber. In the case where the EEC identifier is derived from the identifier of a subscriber, the EEC may include the identifier of a mobile communication service provider derived from a subscription permanent identifier (SUPI), a mobile station international subscriber director number (MSISDN), or a generic public subscription identifier (GPSI), and serial numbers distinguished between mobile communication service providers. In the case where the EEC identifier is provided from a terminal manufacturer, the EEC identifier may be derived from a permanent equipment identifier (PEI). In the case where the EEC identifier is derived from the PEI, the EEC identifier may include the identification information including the identifier of a manufacturer, the number of a manufacturer, a SW number, a model name, and the like. Alternatively, the EEC identifier may be a value preset using a software module of the EEC. If the EEC identifier is the identifier of a software module, the EEC identifier may follow the format of a universally unique identifier (UUID). The EEC identifier may include a unique software package name capable of identifying a software package, which may follow a reversed format of the fully qualified domain name (FQDN), such as "com.samsung.mecframework". In addition, the software package name may include a version name of the software. The EEC identifier may be downloaded from an edge computing service provider to then be installed in the terminal. The EEC identifier may include a serial number issued by an edge computing service provider. In addition, the EEC identifier may include an identifier for distinguishing between edge computing service providers.

In the embodiment described in FIG. 24, the edge enabler client 318 may include the functions of the user agent 312 and the application 314 in the embodiment described in FIG. 3.

In the embodiment described in FIG. 24, the AAF 320 performs the functions of the AAF 320 in the embodiment described in FIG. 3. The AAF 320 may be provided in a 3GPP core network 2410. Alternatively, the AAF 320 may be implemented together with the edge configuration server 2430. Alternatively, as shown in FIG. 24, the AAF 320 may operate separately from the 3GPP core network 2410 and the edge configuration server 2430.

The edge enabler client 318 receives configuration information necessary for exchanging application data traffic with an edge application server 2422. The edge enabler client 318 acquires address information on the available edge application server 2422 in the edge data network 2420.

In the embodiment described in FIG. 24, an edge enabler server (EES) 2424 performs the following functions required for the edge application server 2422 and the edge enabler client 318.

1. Configuration information necessary for exchanging application data traffic with the edge application server 2422
2. Providing information related to the edge application server 2422 to the edge enabler client 318
3. Providing an application programming interface (API) for network functions provided by the 3GPP network In the embodiment described in FIG. 24, the edge configuration server (ECS) 2430 performs functions necessary for the edge enabler client 318 to connect to the edge enabler server 2424. The edge configuration server 2430 provides advance information about the edge configuration information to the edge enabler client 318. The edge configuration information is the information necessary for the edge enabler client 318 to connect to the edge enabler server 2424 and the information for establishing a connection with the edge enabler server 2424.

In the embodiment described in FIG. 24, an application client 316 is an application program installed and operating in the UE 310. In the embodiment described in FIG. 24, the edge application server (EAS) 2422 performs functions of a server in the edge hosting platform in the edge data network 2420 or in the edge hosting environment. The application client 316 is connected to an available service in the edge application server 2424.

Figure 25:
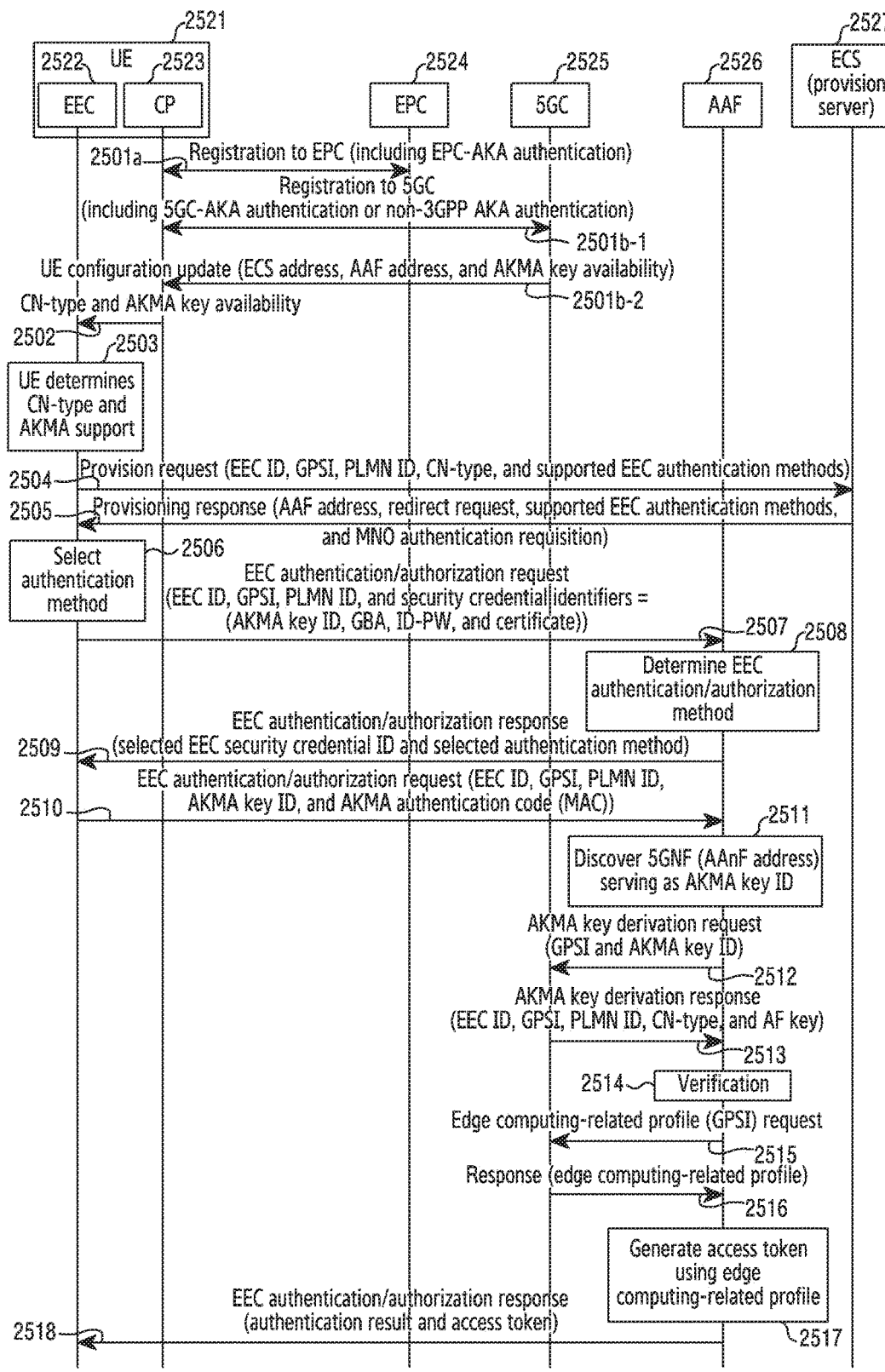
FIG. 25 illustrates a process of determining an authentication method by a terminal and an AAF in the case where a plurality of authentication methods are provided in a wireless communication system according to an embodiment of the disclosure.

FIG. 25 illustrates a process of determining an authentication method by a terminal and an AAF in the case where a plurality of authentication methods are provided in a wireless communication system according to various embodiments. FIG. 25 also encompasses an embodiment in which an authentication method uses authentication and key management for application (AKMA) provided by a 5G core (5GC) network.

In the embodiment in FIG. 25, UE 2521 corresponds to the UE 310 in the embodiment in FIG. 24. Referring to FIG. 25, UE 2521 has an edge enabler client (EEC) 2522 and a communication processor (CP) 2523 therein. The CP 2523 is a device inside the UE 2521, which implements a radio interface for accessing 5G access and 5G core networks and LTE access and evolved packet core (EPC) networks, and includes a modem function therein. The CP 2523 in the UE 2521 accesses an EPC network or a 5GC network.

In step 2501a, the CP 2523 performs registration to an EPC 2524. A registration request message of the CP 2523 may include information of EPC-AKA authentication. In step 2501a, the CP 2523 of the UE 2521 performs an initial attach procedure to the EPC 2524 network. In step 2501a, the UE 2521 and the EPC 2524 network perform an EPC-authentication and key agreement (AKA) authentication procedure.

Alternatively, the UE 2521 performs a registration procedure to a 5GC 2525 network in steps 2501b-1 and 2501b-2.

In step 2501b-1, the CP 2523 performs registration to the 5GC 2525. A registration request message of the CP 2523 may include information on at least one of 5GC-AKA authentication or non-3GPP AKA authentication. 5GC-AKA or extensible authentication protocol (EAP)-AKA authentication is performed during the registration procedure to the 5GC 2525 network.

In step 2501b-2, the 5GC 2525 performs UE configuration update. A UE configuration update message may include at least one of an ECS address, an AAF address, and an AKMA key availability. After successful registration to the 5GC 2525 network, the 5GC 2525 network transmits information on an edge configuration server (ECS) 2527 through the UE configuration update procedure. In step 2501b-2, an access and mobility management function (AMF) of the 5GC 2525 may transmit, to the CP 2523 of the UE 2521, information on whether or not an AKMA key used for ECS authentication is available.

In step 2502, the CP 2523 transmits, to the EEC 2522, information on the CN-type and AKMA key availability. The CP 2523 that has successfully registered to the EPC 2524 network or the 5GC 2525 network transmits, to the EEC 2522, information indicating that access to the EPC 2524 or the 5GC 2525 is successful. In this case, the CP 2523 may transmit, to the EEC 2522, information on the successful accessed 3GPP core network (CN) type (CN-type). The 3GPP core network type information may be 3GPP core network types such as EPC 2524 and 5GC 2525. In addition, the CP 2523 may further transmit, to the EEC 2522, information on the authentication method performed in the EPC 2524 and 5GC 2525 networks and information on the credential available for the CP 2523. The information on the authentication method may be EPC-AKA, 5GC-AKA, or EAP-AKA, and the available credential information may include an AKMA credential, an AKMA authentication method, and a certificate. In the case where AKMA is available for the CP 2523, the CP 2523 may assign a new AKMA key ID for generating an authentication key of the EEC 2522, and may generate an AKMA key corresponding to the AKMA key ID. The AKMA credential generated by the CP 2523 may be transmitted to the EEC 2522. Another method of receiving the AKMA key credential from the CP 2523 by the EEC 2522 is that the EEC 2522 transmits, to the CP 2523, information including an EEC ID, an ECS ID associated with the EEC 2522, or an identifier of an edge computing service provider (ECSP), and the CP 2523 generates a new AKMA ID including an EEC ID, an ECSP identifier, and ECS information in response to the request of the EEC 2522. The CP 2523 may transmit the new AKMA key ID and AKMA key to the EEC 2522.

In step 2503, the UE 2521 determines "CN-type" and "AKMA support". In step 2503, the EEC 2522 in the UE 2521 derives an available authentication method from the information received from the CP 2523 in the UE 2521. For example, in the case where the CP 2523 has performed registration to the 5GC 2525, information indicating that the AKMA is available may be derived. The CP 2523 may transmit information on whether the AKMA is supported through a procedure of registration to the 5GC 2525 network or a security mode command (SMC) procedure, and may receive information indicating that the 5GC 2525 supports the AKMA from an AMF or AUSF of the 5GC 2525. The CP 2523 may determine whether or not to support the AKMA through the capability information exchange procedure described above. If it is determined that the AKMA is available, the CP 2523 may transmit such information to the EEC 2522 in the same manner as step 2502, and the EEC 2522 may recognize whether or not the AKMA is supported. In step 2503, the EEC 2522 in the UE 2521 may determine whether or not the accessed 3GPP core network type (CN-type) information and a possible authentication method are available. Based on this information, the EEC 2522 may select an available authentication method for performing EEC 2522 authentication and authorization procedures.

In step 2504, the EEC 2522 transmits a provisioning request message to the ECS 2527. The provision request message may include information on at least one of an EEC ID, a GPSI, a PLMN ID, a CN-type, and supported EEC authentication methods. In step 2504, the EEC 2522 transmits a provisioning request message to the ECS 2527 using the address of the ECS 2527 (corresponding to the ECS 2430 in the embodiment in FIG. 24), which is preset in the EEC 2522. The provisioning request message may include information on at least one of an EEC 2522 identifier, a GPSI, a serving PLMN ID, a home PLMN ID, a 3GPP core network type (CN-type), and a list of available authentication methods for the EEC 2522. The ECS 2527 receiving the provisioning request message in step 2504 identifies a security credential included in the provisioning request message, and determines whether or not authentication has been made. As to the authentication provision message that does not include an appropriate security credential, the ECS 2527 may determine to redirect the message to the AAF 2526, thereby performing authentication. The ECS 2527, which has determined the redirection to the AAF 2526, may transmit, to the EEC 2522, a preset list of EEC authentication methods available for the AAF 2526. In addition, the ECS 2527 transmits, to the EEC 2522, information including an address of the AAF 2526, an indicator indicating that redirection is necessary, and the reason for performing the redirection. The reason for performing the redirect may include an indicator indicating that EEC authentication/ authorization is required or information indicating that the security credential included in the ECS 2527 is not appropriate.

In step 2505, the ECS 2527 transmits a provisioning response message to the EEC 2522. The provisioning response message may include information on at least one of an AAF address, a redirect request, supported EEC authentication methods, and MNO authentication requisition. In step 2505, the EEC 2522 receives the provisioning response message. The provision response message received by the EEC 2522 includes an AAF address, a redirect request, an indicator indicating that EEC authentication/authorization is required, and an authentication method supported by the AAF 2526.

In step 2506, the EEC 2522 selects an authentication method. The EEC 2522 in the UE 2521 has information on whether or not to provide a method of authentication using a credential for authentication stored in the EEC 2522 (e.g., a certificate and a secret key for the EEC 2522) or using an input directly received from a user through a user interface, as well as the authentication method received from the CP 2523. In the case where a plurality of EEC authentication methods are provided as described above, the EEC 2522 may determine the authentication method according to priority for authentication methods, which is defined in the EEC 2522 through preconfiguration. Alternatively, the priority for authentication methods may be changed by user setting. The EEC 2522 may select one suitable authentication method, or may select multiple authentication methods. If the EEC 2522 is currently connected to the 3GPP core network in step 2502, and if the EEC 2522 receives an indicator indicating that MNO authentication is required in step 2505, the EEC 2522 must select the authentication method through the 3GPP core network. For example, such an authentication method may be a general bootstrapping architecture (GBA) authentication method using AKA authentication in the EPC 2524 network, AKMA authentication in the 5GC 2525 network, an AKMA method for application layer authentication, and the like. In addition, it may be an HTTP (hypertext transfer protocol) AKA method using application layer protocol. Alternatively, in the case where the ECS 2527 is an edge computing service provider, instead of a mobile communication service provider, the provision response message in step 2505 may include information on the edge computing service provider, and if the EEC 2522 has authentication information identified by the identifier of the edge computing service provider, the EEC 2522 may select an authentication method through the information on the edge computing service provider.

In step 2507, the EEC 2522 transmits an EEC 2522 authentication/authorization request message to the AAF 2526. The EEC 2522 authentication/authorization request message may include information on at least one of an EEC 2522 ID, a GPSI, a PLMN ID, and security credential identifiers (e.g., an AKMA key ID, a GBA, an ID-PW, a certificate, and the like). In step 2507, the EEC 2522 transmits, to the AAF 2526, an EEC authentication/authorization request message according to the authentication method selected in step 2506. The EEC authentication/authorization request message may include an identifier of the UE 2521 {e.g., a generic public subscription identity (GPSI)}, an identifier of the EEC 2522 (EEC ID), a current serving PLMN identifier, and a home PLMN identifier. In addition, the EEC 2522 may transmit, to the AAF 2526, a list of security credentials currently available for the UE 2521. The EEC 2522 may transmit, to the AAF 2526, a list of available credentials or identifiers of available security credentials. Alternatively, the EEC 2522 may transmit a list of supported authentication methods. The available credential identifiers may include information on at least one of, for example, AKMA key identifiers, GBA identifiers, GBA request indicators, support/non-support for ID-PW authentication, and certificates.

In step 2508, the AAF 2526 determines the EEC 2522 authentication/authorization method. In step 2508, the AAF 2526 may receive a plurality of authentication methods supported by the EEC 2522 and security credential identifiers, and may determine the authentication method through information configured in the AAF 2526 and information on whether or not to support interworking with a 3GPP network.

For example, if one or more of the following conditions are satisfied, the AAF 2526 may determine the AKMA authentication method as the EEC authentication method.

1. The EEC 2522 is currently connected to a 3GPP core network.
2. The EEC 2522 received an indicator indicating that the AKMA is supported, or received an AKMA key identifier.
3. The AAF 2526 is capable of interworking with the AAnF that provides an AKMA key generation function in a 3GPP 5GC network identified by a home PLMN identifier received from the EEC 2522.
4. It was confirmed that AKMA key generation is supported through an NEF.

Alternatively, if one or more of the following conditions are satisfied, the AAF 2526 may select the GBA authentication method as the EEC authentication method.

1. The GBA is supported in the home PLMN network identified by a home PLMN identifier.
2. The EEC 2522 is currently connected to a 3GPP core network, and the connected network is an EPC network.
3. The EEC 2522 is capable of interworking with a GBA server.
4. An indicator indicating that a client function for GBA interworking is available was received from the UE 2521.

In step 2509, the AAF 2526 transmits, to the EEC 2522, an EEC 2522 authentication/authorization response message. The EEC 2522 authentication/authorization response message may include information on at least one of a selected EEC 2522 security credential ID and a selected authentication method. In step 2509, the AAF 2526 transmits the EEC authentication method determined in step 2508 to the EEC 2522.

If the security credential identifier to be used in the EEC authentication method is selected, the AAF 2526 transmits the selected security credential identifier (ID) to the EEC 2522 in step 2509.

The UE 2521 transmits an EEC authentication request according to the determined authentication method. If the determined authentication method is an AKMA method, the UE 2521 generates an AKMA key and an AKMA key identifier. The AKMA key may be generated by making a request to the CP 2523. In order to generate the AKMA key, the EEC 2522 may generate an AKMA key and an AKMA key identifier by further including an EEC ID, an ECSP identifier, and an indicator for identifying an edge computing service therein. The newly generated AKMA key may be used to verify messages between the EEC 2522 and the AAF 2526. The EEC 2522 transmits a message to the AAF 2526 in step 2510 using the newly generated AKMA key.

In step 2510, the EEC 2522 transmits an EEC authentication/authorization request message to the AAF 2526. The EEC authentication/authorization request message may include information on at least one of an EEC ID, a GPSI, a PLMN ID, an AKMA key ID, and an AKMA authentication code (MAC). In step 2510, the AAF 2526 receives an authentication request message from the EEC 2522. The authentication request message may include information on at least one of an EEC ID, a GPSI, a PLMN ID, an AKMA key ID, and an authentication code authenticated with the AKMA key.

In step 2511, the AAF 2526 discovers a SGNF (i.e., an AAnF address) serving as the AKMA key ID. The AAF 2526 discovers an NEF or AAnF address of the 5GC 2525 network, which is preset for each PLMN. Alternatively, the AAF 2526 may discover the AAnF through the AANF address or routing information to the AAnF included in the authentication request message transmitted by the EEC 2522.

In step 2512, the AAF 2526 transmits an AKMA key derivation request message to the 5GC 2525. The AKMA key derivation request message may include information on at least one of a GPSI and an AKMA key ID. In step 2512, the AAF 2526 transmits an AKMA key derivation request message to the 5GC 2525.

In step 2513, the 5GC 2525 transmits an AKMA key derivation response message to the AAF 2526. The AKMA key derivation response message may include information on at least one of an EEC ID, a GPSI, a PLMN ID, a CN-type, and an AF key. The 5GC 2525 derives an AKMA key from an AKMA key ID, an ECSP identifier, a GPSI, and an AUSF key corresponding to a subscriber using information indicating an ECSP identifier, an EEC ID, and the like, as parameters. In step 2513, the 5GC 2525 transmits the derived AKMA key to the AAF 2526.

In step 2514, the AAF 2526 performs verification. The AAF 2425 receiving the AKMA key from the 5GC 2525 network verifies the AKMA authentication code received in step 2510.

In step 2515, the AAF 2526 transmits, to the 5GC 2525, a request message for an edge computing-related profile (e.g., a GPSI). If the verification is successful, the AAF 2526 makes a direct request to the UDM in the 3GPP 5GC 2525 network for edge computing-related information. The AAF 2526 may transmit a request for edge computing-related information via an NEF in the 5GC 2525 network.

In step 2516, the 5GC 2525 transmits a response message including an edge computing-related profile to the AAF 2526. The AAF 2526 receives edge computing-related subscriber information from the 5GC 2525 network. The edge computing-related subscriber information may include at least one piece of the following information.

1. Edge computing service profile identifier
2. Edge computing service profile index
3. At least one of subscriber category information and subscriber level
4. Information on whether user subscribes to edge computing service
5. List of S-NSSAIs and DNNs licensed by edge computing service provider (ECSP)
6. List of S-NSSAIs or DNNs licensed for edge computing purposes
7. List of ECSP identifiers under edge computing agreement
8. Application profile:
8-1. Information on minimum and maximum latency between UE 2521 and edge application server (EAS) in application layer
8-2. Information on transfer rate in application layer: maximum transfer rate and average transfer rate
8-3. Required computing resource information: maximum and average performance of CPU/GPU, CPU/GPU type, and required memory and storage size
9. List of S-NSSAIs and DNNs that satisfy application profile conditions
10. S-NSSAIs and DNNs, application profile information satisfied by S-NSSAIs and DNNs, or application profile index for predefined application profile conditions In step 2517, the AAF 2526 performs generation of an access token with the edge computing-related profile. The AAF 2526 may generate the access token, based on the edge computing profile information received from the 3GPP core network. The access token for edge computing access includes at least one piece of the following information.

1. Token issue date
2. Expiration time
3. Application profile index
4. Subscription level
5. Subscription category
6. 3GPP core network operator PLMN identifier
7. Information on ECSP or PLMN that issued token
8. Information on S-NSSAIs and DNNs available for edge computing in EEC 2522
9. Token issuer's signature: The signature is an authentication code capable of verifying the content of the token and is generated using the issued AKMA key.

The issued edge computing access token may be encrypted using the AKMA key.

In step 2518, the AAF 2526 transmits an EEC authentication/authorization response message to the EEC 2522. The EEC authentication/authorization response message may include information on at least one of an authentication result and an access token. The edge computing access token issued in step 2517 is transmitted to the UE 2521 together with the authentication result in step 2518.

After step 2518, the EEC 2522 may decrypt the transmitted access token using the AKMA key. In addition, when interworking with the ECS 2527 (corresponding to the ECS 2430 in the embodiment in FIG. 24) and the EES (corresponding to the EES 2424 in the embodiment in FIG. 24) later, the EEC 2522 may use the access token. In addition, if an application client of the UE 2521 requests a slice, the EEC 2522 may make a request for access to a designated slice specified in the access token. If an application client requests a specific slice, but the edge computing profile information allowed in the access token received by the EEC 2522 does not include the information on the specific slice requested by the application client, the EEC 2522 may reject the request for generating a new slice by the application client. If the application client requests the use of a specific DNN or generation thereof, the EEC 2522 identifies whether or not the access token includes information about the specific DNN. If the information on the specific DNN is not included in the allowed DNN information, the EEC 2522 may reject the request for the use of the specific DNN or the generation thereof requested by the application client. Alternatively, the EEC 2522 may provide a service to the application client using a DNN other than the specific DNN requested.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An operation method of a user equipment (UE) in a wireless communication system, the method comprising:
    performing an authentication procedure to access the wireless communication system;
    obtaining an authentication and key management for application (AKMA) key for an edge computing service based on the authentication procedure;
    transmitting, to a server, a request message for requesting authorization for the edge computing service, wherein the request message includes an AKMA key identifier (ID) corresponding to the AKMA key;
    receiving, from the server, a response message indicating authority granted to the edge computing service, wherein the response message includes an access token for the edge computing service based on the AKMA key ID; and
    using the edge computing service corresponding to the access token.

2. The method of claim 1, wherein the authentication procedure is performed based on at least one of an authentication method based on a universal subscriber identity module (USIM) credential, an authentication method based on a user portal, an authentication method based on a credential generated using information related to the UE, or an authentication method based on transmission of a one-time password (OTP).

3. The method of claim 1, wherein, when the authentication procedure is performed based on a universal subscriber identity module (USIM) credential, the performing of the authentication procedure comprises:
    receiving, from the server, a message including random number information and an authentication token necessary for the UE to perform an authentication procedure; and
    identifying whether or not the authentication token included in the received message matches an authentication token generated by the UE.

4. The method of claim 1,
    wherein, when the authentication procedure is performed based on a user portal, the performing of the authentication procedure comprises:
        displaying a screen for inputting authentication credential information, based on a message for inputting the authentication credential information received from the server;
        detecting an input of the authentication credential information; and
        transmitting the authentication credential information to the server, and
    wherein the authentication credential information comprises at least one of a user identification (ID) or a password.

5. The method of claim 1, wherein, when the authentication procedure is performed based on a credential generated using information related to the UE, the performing of the authentication procedure comprises:
    receiving, from the server, a request message comprising random number information generated by the server;
    generating a message authentication code (MAC), based on at least one piece of the random number information included in the received request message or the information related to the UE;
    transmitting a response message including the MAC to the server; and
    receiving the authentication code from the server, based on verification of the MAC included in the response message.

6. The method of claim 1, wherein, when the authentication procedure is performed based on a transmission of a one-time password (OTP), the performing of the authentication procedure comprises:
    receiving an OTP from the server;
    receiving, from the server, a request message comprising random number information generated by the server;
    generating a message authentication code (MAC), based on at least one of piece of the random number information included in the received request message, a value of the received OTP, or the information related to the UE;
    transmitting a response message including the MAC to the server; and
    receiving the authentication code from the server, based on verification of the MAC included in the response message.

7. The method of claim 1, wherein the access token is encrypted based on the AKMA ID.

8. An operation method of a server for authorization for an edge computing service, the method comprising:
    receiving, from a user equipment (UE), a request message for requesting authorization for the edge computing service, wherein the request message includes an authentication and key management for application (AKMA) key identifier (ID) corresponding to the AKMA key;

determining whether the UE is authorized to access the edge computing service;

generating an access token for the UE when the UE is authorized to access the edge computing service; and transmitting a response message indicating authority granted to the edge computing service, wherein the response message includes an access token for the edge computing service based on the AKMA key ID.

9. The method of claim 8, wherein the AKMA key is based on at least one of an authentication method based on a universal subscriber identity module (USIM) credential, an authentication method based on a user portal, an authentication method based on a credential generated using information related to the UE, or an authentication method based on transmission of a one-time password (OTP).

10. A user equipment (UE) device in a wireless communication system, the device comprising:

a transceiver; and at least one processor connected to the transceiver, wherein the at least one processor is configured to:

perform an authentication procedure to access the wireless communication system, obtain an authentication and key management for application (AKMA) key for an edge computing service based on the authentication procedure, transmit, to a server, a request message for requesting authorization for the edge computing service, wherein the request message includes an AKMA key identifier (ID) corresponding to the AKMA key, receive, from the server, a response message indicating authority granted to the edge computing service, wherein the response message includes an access token for the edge computing service based on the AKMA key ID, and use the edge computing service corresponding to the access token.

11. The device of claim 10, wherein the authentication procedure is performed based on at least one of an authentication method based on a universal subscriber identity module (USIM) credential, an authentication method based on a user portal, an authentication method based on a credential generated using information related to the UE, or an authentication method based on transmission of a one-time password (OTP).

12. The device of claim 10, wherein, when the authentication procedure is performed based on a universal subscriber identity module (USIM) credential, the at least one processor is further configured to:

receive, from the server, a message including random number information and an authentication token necessary for the UE to perform an authentication procedure; and identify whether or not the authentication token in the received message matches an authentication token generated by the UE.

13. The device of claim 10, wherein, when the authentication procedure is performed using a user portal, the at least one processor is further configured to:

display a screen for inputting authentication credential information, based on a message for inputting the authentication credential information received from the server, detect an input of the authentication credential information, and transmit the authentication credential information to the server, and wherein the authentication credential information comprises at least one of a user identification (ID) or a password.

14. The device of claim 10, wherein, when the authentication procedure is performed based on a credential generated using information related to the UE, the at least one processor is further configured to:

receive, from the server, a request message comprising random number information generated by the server;

generate a message authentication code (MAC), based on at least one piece of the random number information included in the received request message or the information related to the UE;

transmit a response message including the MAC to the server; and receive the authentication code from the server, based on verification of the MAC included in the response message.

15. The device of claim 10, wherein, when the authentication procedure is performed based on a transmission of a one-time password (OTP), the at least one processor is further configured to:

receive an OTP from the server;

receive, from the server, a request message comprising random number information generated by the server;

generate a message authentication code (MAC), based on at least one piece of the random number information included in the received request message, a value of the received OTP, or the information related to the UE;

transmit a response message including the MAC to the server; and receive the authentication code from the server, based on verification of the MAC included in the response message.

16. The device of claim 10, wherein the access token is encrypted based on the AKMA ID.

* * * * *